(12) United States Patent
Deckman

(10) Patent No.: US 12,497,565 B2
(45) Date of Patent: Dec. 16, 2025

(54) VERIFIABLE AND REPAIRABLE PRESERVED BIOLANDFILL FOR BIOLOGICAL CARBON SEQUESTRATION AND COMPOSITIONS FOR BIOLOGICAL CARBON PRESERVATION

(71) Applicant: Graphyte, Inc., Memphis, TN (US)

(72) Inventor: Harry William Deckman, Clinton, NJ (US)

(73) Assignee: Graphyte, Inc., Memphis, TN (US)

( * ) Notice: Subject to any disclaimer, the term of this patent is extended or adjusted under 35 U.S.C. 154(b) by 461 days.

(21) Appl. No.: 18/316,132

(22) Filed: May 11, 2023

(65) Prior Publication Data

US 2024/0002731 A1 Jan. 4, 2024

Related U.S. Application Data

(60) Provisional application No. 63/432,047, filed on Dec. 12, 2022, provisional application No. 63/342,928, filed on May 17, 2022.

(51) Int. Cl.
| | | |
|---|---|---|
| *C10B 49/10* | (2006.01) | |
| *C10B 53/02* | (2006.01) | |
| *C10J 3/00* | (2006.01) | |

(52) U.S. Cl.
CPC .............. *C10B 49/10* (2013.01); *C10B 53/02* (2013.01); *C10J 3/00* (2013.01); *C10J 2300/0916* (2013.01); *C10J 2300/0956* (2013.01); *C10J 2300/0969* (2013.01); *C10J 2300/0973* (2013.01); *C10J 2300/1612* (2013.01)

(58) Field of Classification Search
None
See application file for complete search history.

(56) References Cited

U.S. PATENT DOCUMENTS

| | | |
|---|---|---|
| 4,432,666 A | 2/1984 | Frey et al. |
| 5,435,819 A | 7/1995 | Andrews, Jr. et al. |
| 5,558,694 A | 9/1996 | Andrews, Jr. et al. |
| 5,560,757 A | 10/1996 | Suzuki et al. |
| 5,767,390 A | 6/1998 | Chapman, IV |
| 6,420,022 B2 | 7/2002 | Bonke et al. |
| 6,749,368 B2 | 6/2004 | Ankeny et al. |
| 7,056,062 B2 | 6/2006 | Takeuchi et al. |
| 8,280,795 B2 | 10/2012 | Rhodes, III |
| 8,600,865 B2 | 12/2013 | Rhodes, III |
| 8,662,791 B2 | 3/2014 | Allen et al. |
| 10,190,392 B1 | 1/2019 | Bachus et al. |
| 11,045,832 B1 | 6/2021 | Hubbard |
| 11,511,325 B2 | 11/2022 | Meade, II |

(Continued)

FOREIGN PATENT DOCUMENTS

| | | |
|---|---|---|
| CN | 103305303 A | 9/2013 |
| CN | 108152231 A | 6/2018 |

(Continued)

OTHER PUBLICATIONS

International Preliminary Report on Patentability for PCT Application No. PCT/US2023/082642 mailed Jun. 12, 2025, 8 pages.

(Continued)

*Primary Examiner* — Daniel Berns
(74) *Attorney, Agent, or Firm* — COOLEY LLP

(57) ABSTRACT

The present invention is directed to a dry tomb biolandfill for biological carbon sequestration, and more particularly compositions of a biolandfill containing a salt biomass composite.

17 Claims, 12 Drawing Sheets

(56) References Cited

U.S. PATENT DOCUMENTS

| | | |
|---|---|---|
| 2004/0173006 A1 | 9/2004 | McCoy et al. |
| 2005/0220542 A1 | 10/2005 | Marsh et al. |
| 2006/0118726 A1 | 6/2006 | Kawabata et al. |
| 2008/0044889 A1 | 2/2008 | Augenstein |
| 2009/0261037 A1 | 10/2009 | Clifford, III et al. |
| 2010/0145716 A1 | 6/2010 | Zeng |
| 2010/0257775 A1 | 10/2010 | Cheiky |
| 2010/0300368 A1 | 12/2010 | Myers et al. |
| 2011/0068501 A1 | 3/2011 | Rosenbaum |
| 2012/0023001 A1 | 1/2012 | Rhodes, III |
| 2012/0330726 A1 | 12/2012 | Rhodes, III |
| 2014/0032129 A1 | 1/2014 | Rella et al. |
| 2014/0122351 A1 | 5/2014 | Rhodes, III |
| 2016/0120410 A1 | 5/2016 | Kim |
| 2016/0200002 A1 | 7/2016 | Medoff |
| 2017/0245494 A1 | 8/2017 | Bardosh et al. |
| 2017/0347660 A1 | 12/2017 | Eichler |
| 2017/0362418 A1 | 12/2017 | LaPray et al. |
| 2018/0154408 A1 | 6/2018 | Ko et al. |
| 2020/0056982 A1 | 2/2020 | Khan et al. |
| 2020/0208063 A1 | 7/2020 | Quanci et al. |
| 2020/0379147 A1 | 12/2020 | Invie et al. |
| 2023/0047581 A1 | 2/2023 | Liu et al. |
| 2023/0106744 A1 | 4/2023 | Chalfin et al. |
| 2023/0132655 A1 | 5/2023 | Meissner et al. |
| 2023/0311178 A1 | 10/2023 | Summers et al. |
| 2023/0374387 A1 | 11/2023 | Deckman |
| 2024/0109110 A1 | 4/2024 | Quigley et al. |

FOREIGN PATENT DOCUMENTS

| | | |
|---|---|---|
| CN | 115430401 A | 12/2022 |
| DE | 102013018179 A1 | 6/2015 |
| EP | 4308318 A2 | 1/2024 |
| TW | I509034 B | 11/2015 |
| WO | WO-2012024068 A2 | 2/2012 |
| WO | WO-2020230066 A1 | 11/2020 |
| WO | WO-2021000039 A1 | 1/2021 |
| WO | WO-2024129452 A1 | 6/2024 |
| WO | WO-2024129470 A1 | 6/2024 |
| WO | WO-2024229280 A1 | 11/2024 |
| WO | WO-2025101430 A1 | 5/2025 |
| WO | WO-2025101431 A1 | 5/2025 |

OTHER PUBLICATIONS

International Preliminary Report on Patentability for PCT No. PCT/US2023/082731 mailed Jun. 26, 2025, 9 pages.
International Search Report and Written Opinion for PCT Application No. PCT/US2024/054072 mailed Feb. 5, 2025, 14 pages.
International Search Report and Written Opinion for PCT Application No. PCT/US2024/054073 mailed Jan. 27, 2025, 14 pages.
International Search Report and Written Opinion for PCT Application No. PCT/US2025/026493 mailed Jun. 25, 2025, 15 pages.
International Search Report and Written Opinion for PCT Application No. PCT/US2025/027506 mailed Jul. 14, 2025, 18 pages.
Lee et al., "NaCl-saturated brines are thermodynamically moderate, rather than extreme, microbial habitats". FEMS microbiology reviews. Sep. 2018;42(5):672-93.
Merino et al., "Living at the extremes: extremophiles and the limits of life in a planetary context". Frontiers in microbiology. Apr. 15, 2019;10: 25 pages.
Sanchez et al., "Carbon removal efficiency and energy requirement of engineered carbon removal technologies". RSC Sustainability. 2025, 10 pages.
U.S. Appl. No. 18/540,655, filed Dec. 14, 2023, by Voorhis et al.
U.S. Appl. No. 19/137,470, filed Jun. 10, 2025, by Deckman et al.
U.S. Appl. No. 19/137,482, filed Jun. 10, 2025, by Deckman et al.
International Search Report for International Application No. PCT/US2024/027523, mailed Jul. 30, 2024, 12 pages.
Invitation to Pay Additional fees for International Application No. PCT/US2024/054072, mailed Dec. 4, 2024, 3 pages.
Invitation to Pay Additional fees for International Application No. PCT/US2024/054073, mailed Dec. 2, 2024, 2 pages.
Lee et al, "Sustained wood burial in the Bengal Fan over the last 19 My". Proceedings of the National Academy of Sciences. Nov. 5, 2019; 116(45): 22518-25.
Liang et al., "Large-scale restoration increases carbon stability under projected climate and wildfire regimes". Frontiers in Ecology and the Environment. May 2018; 16(4): 207-12.
Matsakas et al., "Sequential parametric optimization of methane production from different sources of forest raw material". Front Microbiol. Oct. 20, 2015;6: 10 pages.
Stephens et al., "Forest restoration and fuels reduction work: Different pathways for achieving success in the Sierra Nevada." Ecological Applications. Mar. 2024; 34(2): 17 pages.
Wang et al., "Wood biodegradation in laboratory-scale landfills. Environmental science & technology". Aug. 15, 2011; 45(16): 6864-71.
Ximenes et al., "Improving understanding of carbon storage in wood in landfills: Evidence from reactor studies". Waste Management. Feb. 15, 2019; 85: 341-50.
Zeng et al., "Implementation Guidance for Wood Harvesting and Storage". Version 1.0, Aug. 22, 2023, 46 pages. Retrieved from internet on Dec. 4, 2024: https://arxiv.org/pdf/2309.06529.
Amelse et al., "Sequestering biomass for natural, efficient, and low-cost direct air capture of carbon dioxide (Version 3)". (Jul. 22, 2021), 24 pages. Available at SSRN: https://ssrn.com/abstract=3866924 or http://dx.doi.org/10.2139/ssrn.3866924.
Barlaz "Carbon storage during biodegradation of municipal solid waste components in laboratory-scale landfills". Global biogeochemical cycles. Jun. 1998; 12(2): 373-80.
Barlaz "Forest products decomposition in municipal solid waste landfills". Waste Management. Jan. 1, 2006; 26(4): 321-33.
Demirdogen "Numerical Analysis of Leakage through Defective Geomembrane Liners in Embankment Dams". University of South Florida; 2018, 93 pages.
Hess et al., "Uniform Format Bioenergy Feedstock Supply System Design Report Series: Commodity-Scale Production of an Infrastructure-Compatible Bulk Solid from Herbaceous Lignocellulosic Biomass", Apr. 2019, 204 pages.
Hess et al., "Uniform-Format Solid Feedstock Supply System: A Commodity-Scale Design to Produce an Infrastructure-Compatible Bulk Solid from Lignocellulosic Biomass". Executive Summary. Idaho National Lab.(INL), Idaho Falls, ID (United States); Apr. 1, 2009. 16 pages.
Hettiaratchi et al., "Recent advances of biomass waste to gas using landfill bioreactor technology—a review". Current Organic Chemistry. Mar. 1, 2015; 19(5): 413-22.
International Organization for Standardization. ISO 17225-3:2021(E)—Solid Biofuels—Fuel Specifications and Classes—Part 3: Graded Wood Briquettes. International Organization for Standardization; Geneva, Switzerland: 2021, 14 pages.
International Search Report and Written Opinion for PCT Application No. PCT/US2023/082642 mailed May 10, 2024, 11 pages.
International Search Report and Written Opinion for PCT Application No. PCT/US2023/082731 mailed Apr. 24, 2024, 13 pages.
Janssen et al., "Water activity and moisture: The complexity and interrelationships explained". Tablets & Capsules. Sep. 2020; 18(6): 28-36.
Jijo "Gas permeability and retention study on Ämmässuo temporary landfill cover structures made with municipal solid waste incineration bottom ash (Master's thesis)", Aalto University School of Engineering, Mar. 12, 2018, 123 pages. retrieved from the internet on Aug. 28, 2024 https://aaltodoc.aalto.fi/server/api/core/bitstreams/3f32693c-14db-4325-be63-c4015dbda9c9/content.
Keller et al., "Water vapor permeation in plastics". Pacific Northwest National Lab.(PNNL), Richland, WA (United States); Jan. 1, 2017, 37 pages.
Mensah et al., "Assessment of quantities and composition of corn stover in Ghana and their conversion into bioethanol". Scientific African. Jul. 1, 2021;12: 12 pages.
Metzger et al., "Sequestering of atmospheric carbon through permanent disposal of crop residue". Climatic Change. Apr. 2001; 49(1): 11-9.

(56) References Cited

OTHER PUBLICATIONS

Miao et al., "Energy and pressure requirement for compression of Miscanthus giganteus to an extreme density". Biosystems engineering. Jan. 1, 2013; 114(1): 21-5.

Micales et al., "The decomposition of forest products in landfills". International Biodeterioration & Biodegradation. Jan. 1, 1997; 39(2-3): 145-58.

Miller et al., "Living in the Environment (17th Edition)", Jan. 1, 2011 (Jan. 1, 2011), Chapter 21: Solid and Hazardous Waste, 31 pages.

Nurek et al., "Influence of the Die Height on the Density of the Briquette Produced from Shredded Logging Residues". Materials 2021, 14, 13 pages.

Pommier et al., "A logistic model for the prediction of the influence of water on the solid waste methanization in landfills". Biotechnology and bioengineering. Jun. 15, 2007; 97(3): 473-82.

Restelatto et al., "Effects of holes in plastic film on the storage losses in total mixed ration silage in round bales". Translational Animal Science. Jul. 2019;3(4):1543-9.

Screenshot "Biomass Harvesting and Storage (Airminers Event Series)." YouTube, uploaded by AirMiners, Oct. 1, 2021, 1 page. https://www.youtube.com/watch?v=CGsQnKl_Oyc.

Screenshot "Eli Yablonovitch: Solar Solved—Next, Carbon Negative Technology." YouTube, uploaded by NAS Colloquia, Nov. 26, 2018, 1 page. https://www.youtube.com/watch?v=d8-KEdmG-WU.

Screenshot "Puro Standard Biomass Burial carbon removal methodology webinar." YouTube, uploaded by puro_earth, Mar. 10, 2022, 1 page. https://www.youtube.com/watch?v=bhljd7UTbiw.

Smith et al., "Practical considerations of moisture in baled biomass feedstocks". Biofuels. Jan. 1, 2013; 4(1): 95-110.

Strogen "The Role of Biomass in Achieving Climate and Energy Goals". EM: Air & Waste Management Association's Magazine for Environmental Managers. 2013, 3 pages.

Wang et al., "Decomposition and carbon storage of selected paper products in laboratory-scale landfills". Science of the Total Environment. Nov. 1, 2015; 532: 70-9.

Wang et al., "Decomposition of forest products buried in landfills". Waste management. Nov. 1, 2013; 33(11): 2267-76.

Waste Management "Typical Anatomy of a Landfill" (2003), 1 page. Retrieved from Internet: https://www.wm.com/thinkgreen/pdfs/Anatomy_of_a_Landfill.pdf.

Ximenes et al., "The decay of engineered wood products and paper excavated from landfills in Australia". Waste Management. Apr. 1, 2018; 74: 312-22.

Ximenes et al., "The decay of wood in landfills in contrasting climates in Australia". Waste Management. Jul. 1, 2015; 41: 101-10.

Ximenes et al., "The decomposition of wood products in landfills in Sydney, Australia". Waste Manag. Nov. 2008; 28(11): 2344-54. Epub Jan. 4, 2008.

Zeng et al., "Carbon sequestration via wood harvest and storage: an assessment of its harvest potential". Climatic Change. May 2013;118: 245-57.

Zeng et al., "Wood Vault: remove atmospheric CO2 with trees, store wood for carbon sequestration for now and as biomass, bioenergy and carbon reserve for the future". Carbon Balance and Management. Apr. 1, 2022; 17(1): 29 pages.

Freeman J. Dyson, Can We Control The Carbon Dioxide In The Atmosphere?, Energy vol. 2 pp. 217-291. Pergamon Press 1977.

Ning Zeng, Carbon sequestration via wood burial, Carbon Balance Management 3, 1 2008, https://doi.org/10.1186/1750-0680-3-1.

M. Milke, Y. Fang, S. John, "Anaerobic biodegradability of wood: a preliminary review", 2010 Water New Zealand Annual Conference, Sep. 22-24, 2010 Christchurch, New Zealand.

A. Stevenson et. al., "Is there a common water-activity limit for the three domains of life?" The ISME Journal 9, 1333-1351, 2015.

E. Yablonovitch and H. W. Deckman, "Scalable, economical, and stable sequestration of agricultural fixed carbon", Proceedings of The National Academy of Sciences (PNAS), 120 (16), Apr. 11, 2023 e2217695120.

E. Yablonovitch and H. W. Deckman, "Scalable, economical, and stable sequestration of agricultural fixed carbon", Proceedings of The National Academy of Sciences (PNAS), 120 (16), Apr. 11, 2023 e2217695120, Supporting Information.

H. Deckman and E. Yablonovitch, Preprint "Scalable, Economical, and Stable Sequestration of Agricultural Fixed Carbon" (Oct. 17, 2022). Available at SSRN: https://ssrn.com/abstract=4305125 or http://dx.doi.org/10.2139/ssrn.4305125.

VERIFIABLE AND REPAIRABLE PRESERVED BIOLANDFILL FOR BIOLOGICAL CARBON SEQUESTRATION AND COMPOSITIONS FOR BIOLOGICAL CARBON PRESERVATION

CROSS REFERENCE TO RELATED APPLICATIONS

The present application claims priority to Provisional Patent Application(s) 63/342,928 (Filed May 17, 2022) and 63/432,047 (Filed Dec. 12, 2022).

BACKGROUND

The present invention is described in co-pending Climate science scenarios limiting global temperature rise to less than 2 degrees by the end of the century require carbon negative options which remove $CO_2$ from the atmosphere. One approach to carbon negativity is to capture and store biological (or organic) carbon that is photosynthetically converted from atmospheric $CO_2$ in growing plants and trees. It has long been recognized that the amount of carbon that could be captured from agriculture and forest lands is more than enough to offset global warming ("*Can We Control The Carbon Dioxide In The Atmosphere?*", Freeman J. Dyson, Energy Vol 2. PP 217-291. Pergamon Press 1977).

Proposals have involved growing short-lived plants which are converted to humus or allowed to accumulate in artificial peat-bogs ("*Can We Control The Carbon Dioxide In The Atmosphere?*", Freeman J. Dyson, Energy Vol. 2 PP 217-291. Pergamon Press 1977) or harvesting woody biomass and burying it in trenches under a layer of soil ("Carbon sequestration via wood burial", Ning Zeng, Carbon Balance Management 3, 1 2008, https://doi.org/10.1186/1750-0680-3-11. In both these approaches harvested biomass will be stored in a wet anaerobic environment (due to groundwater invasion) where a fraction of the biomass will be anaerobically degraded releasing $CO_2$ and methane. The IPCC has estimated that 50% of wood will degrade in wet landfill environments releasing copious quantities of methane making the storage a net greenhouse gas emitter rather than a technology that would offset greenhouse gas emissions. A lower estimate of greenhouse gas emissions has been published for wet anaerobic degradation of wood, estimating that wet anaerobic storage would be greenhouse gas neutral ("*Anaerobic biodegradability of wood: a preliminary review*", M. Milke, Y. Fang, S. John, 2010 Water New Zealand Annual Conference, 22-24 Sep. 2010 Christchurch, New Zealand). In all events because of methane emissions, the simple anerobic storage of woody biomass in wet anaerobic environments is not a realistic solution to global warming. However, a solution which stores biomass and prevents rapid degradation has the potential to offset a significant fraction of the world $CO_2$ emissions. Of almost equal importance is finding a solution which monitors degradation of stored biomass making the solution verifiable and if needed repairable. This invention provides a solution to both problems.

To provide perspective, a successful technology offsetting approximately a fourth of the world's greenhouse gas emissions (an amount nearly equal to 10 Giga-tonne of $CO_2$ equivalent per year) with harvested biomass having 50 wt. % carbon content and yearly crop yields of 10 dry metric tonne per acre would require agricultural production from ~6 $10^8$ acres or equivalently ~2.5 $10^6$ kilometer$^2$. This hypothetical scenario would require ~17% of land used to grow row crops (wheat, corn . . . ), or ~5% of the earth's forest land, or 7% of the earth's ranchland and pastures. By comparison, many integrated assessment models presented by the IPCC require an increase in land used for biofuel production by the year 2100 of ~12 $10^6$ kilometer$^2$, distributed between forests and bioenergy crops. The integrated assessment models reported by the IPCC project that such large acreages would come primarily from reductions in pasture and crop land, with a minor decrease in in a category referred to as "natural land" that approximately corresponds to shrub land in other inventories of the earth's land use. While these areas of land needed for offsetting a quarter of the worlds greenhouse gas emissions are substantial, deployment at this scale is feasible if substantial atmospheric carbon drawdown is desired by the global community.

SUMMARY OF THE INVENTION

The present invention is directed to a biolandfill for biological carbon sequestration, and more particularly compositions of a biolandfill containing a salt biomass composite.

BRIEF DESCRIPTION OF THE DRAWINGS

The following figures are included to illustrate certain aspects of the embodiments, and should not be viewed as limiting embodiments.

DETAILED DESCRIPTION

Figure 1:
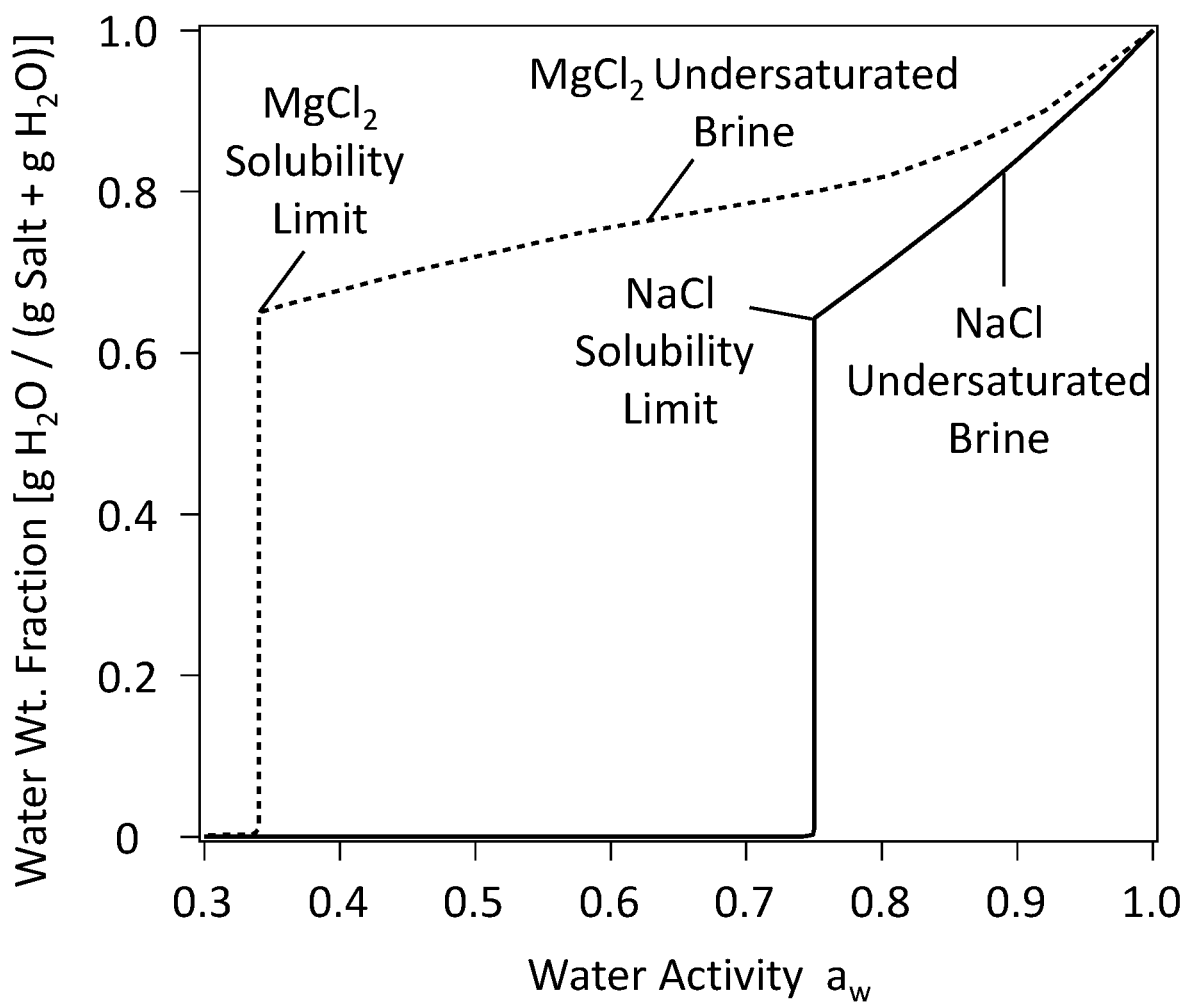
FIG. 1 shows water sorption isotherms at 25 C for two salts (NaCl and $MgCl_2$) showing water uptake as water activity is increased from 0.3 to 1.0.

This invention pertains to the sequestration of biogenic carbon that is produced and stored by the flora on our planet as a natural consequence of its photosynthetic life cycle. For this invention biogenic carbon is harvested as biomass before the flora reaches the end of its carbon life cycle and degrades. In some embodiments the biomass is processed to produce other products, for example gaseous and liquid fuels, with a fraction of the biogenic carbon remaining unconverted but may be chemically modified. This fraction of biogenic carbon will also be referred to as biomass and in some instances referred to as chemically altered biomass.

For sequestration and preservation, the biomass is composited with salt and encased within the dry tomb structure of a biolandfill. The composite material that is sequestered comprises a blend, mixture, dispersion, amalgamation, interminglement, jumbling, or layering of biomass, solid or deliquesced salt, and in some cases undersaturated, saturated or supersaturated brine. In some instances salt is only located in a portion of the biomass encased within the dry tomb structure. To form a composite that preserves biomass the average salt content (salt weight counting solids and brines) in the dry tomb structure should be at least 0.0001 wt. % of the dry weight of the biomass and in all cases less than 75 wt. % of the dry weight of the biomass. In another embodiment average salt content (salt weight counting solids and salt in brines) in the dry tomb structure is at least 0.001 wt. % of the dry weight of the biomass, while in other embodiments it is at least 0.01 wt. %, or at least 0.1 wt. %, or at least 1 wt. % of the dry weight of the biomass. This average is computed from the total weight of salt within the dry tomb divided by the dry weight of biomass encased within the dry tomb. Nonlimiting examples of salts are NaCl, $MgCl_2$, KCl, $CaCl_2$, and mixtures thereof. It is also possible to segregate different types of salts in the dry tomb structure, placing different types of salts in different locations. In forming the dry tomb structure, it is preferred to composite biomass with salt in a solid form as opposed to an undersaturated, saturated or supersaturated brine. Water ingress during construction or during sequestration may create undersaturated, saturated or supersaturated brines that are a component of the salt biomass composite. As such the salt biomass composite can comprise biomass with solid salts that may be hydrated or deliquesced as well as brines that may be unsaturated, saturated, or supersaturated.

The composite of salt and biomass encased within the dry tomb structure of a biolandfill provides a means of safely, efficiently, and economically storing carbon in biomass without significant degradation for hundreds to thousands of years helping to offset $CO_2$ emissions and mitigating climate change. The biolandfill composition maintains a dry environment mitigating biomass decomposition processes and in a preferred embodiment allows verification of any significant evolution of $CO_2$ and/or methane greenhouse gasses from biomass decomposition. In addition, the salt helps to maintain a dry environment further mitigating biomass decomposition processes. In an even more preferred embodiment if an unacceptable water content or evolution of greenhouse gases is detected a means is provided to further dry the biolandfill, repairing the environment needed to store the biomass The dry tomb structure in the biolandfill is formed from at least top and bottom seals that are joined together to completely encase the salt biomass composite and prevent ingress of ground or rainwater into the dry tomb. The seals prevent hydraulic flow of water and also have ultra-low permeability limiting diffusional ingress of water. This dry tomb structure will also be referred to as a dry tomb. Top and bottom seals are taken to be part of the dry tomb structure and contain at least one water transport barrier that is sealed to form a watertight barrier preventing hydraulic flow of water into the dry tomb structure. In addition, the water transport barrier has a low water permeability that limits diffusion of water vapor across the barrier. Its function is the opposite of water transport barriers in conventional municipal landfills and toxic waste landfills. In conventional municipal and toxic waste landfills water transport barriers are used to prevent the contamination of ground waters from outward transport of polluted waters contained in the landfill as opposed to preventing inward transport of ground water into a dry biomass. Size of the dry tomb structure is defined by the outermost extent of the top and bottom seals.

In a preferred embodiment the top and bottom seals contain nested inner and outer water transport barriers. Ideally the barriers are nested with a spacer structure separating the inner and outer water transport barriers. The separating structure is a layer or region, or structure between each of the nested water transport barriers which can improve mechanical stability and adds mass transfer resistance to the ingress of water from defects. The inner water transport barrier in the top seal is joined to the inner water transport barrier in the bottom seal. The outer water transport barrier in the top seal is joined to the outer transport barrier in the bottom seal. In all cases each water transport barrier is sealed to form a watertight barrier preventing hydraulic flow of water across it and has a low permeability to water vapor diffusion. Having multiple nested water transport barriers lowers the probability of infrequent defect alignment, significantly lowering net hydraulic ground water transport through defects into the dry tomb structure. Pinholes and/or defects will occur very infrequently and the probability of pinholes or defects lining up in this nested structure is infinitesimal. For nesting a minimum of two water transport barriers is required. Additional nested water transport barriers can be used to increase the diffusional mass transfer resistance lowering the rate at which ground water can diffusionally transport into the dry tomb structure. In a preferred embodiment the water transport barrier is a geomembrane. The top and bottom seals can in addition contain multiple layers that incorporate geotextiles, geocomposites, a geosynthetic fabric, a geonet, clay or geosynthetic clay layers as well as soil. A more detailed description of the dry tomb landfill for biological carbon sequestration is found in co-pending applications 63/342,928 (Filed May 17, 2022) and 63/432,047 (Filed Dec. 12, 2022) which are hereby incorporated by reference.

In a preferred embodiment biomass in the dry tomb has a low water content and there is a low thermodynamic activity of water in the vapor phase within void or macropore spaces that equilibrate with water sorbed by biomass and salt. If a design with a single water barrier surrounding the dry salt biomass composite is employed, substantial care in construction of the barrier need be exercised to help ensure that it remains impermeable. There is a finite probability of having a small defect in the barrier through which ground water hydraulically ingresses into the dry tomb. If this occurs salt in the composite material would dissolve lowering the thermodynamic activity of ingressed water, helping to keep the biomass from degrading. In additional embodiments there are more than two nested water transport barriers within the top and bottom seal structures.

In a preferred embodiment at least one additional element is incorporated into the biolandfill allowing verification of whether biogas is being generated or whether the thermodynamic activity of water in the biolandfill is increasing. In its simplest form there is one sealable pipe or conduit connecting the surface of the earth to the interior of the dry tomb. Incorporating this element permits measurement of any pressure buildup from biogas generation within the dry tomb structure and/or measurement of the composition of gas flowing out of an opened pipe or conduit relieving any pressure built up in the dry tomb. Addition of this element (a pipe or conduit that can be sealed and opened) does not provide an effective means to repair the state of the biolandfill if the thermodynamic activity of water rises to the point that biomass begins to decompose.

In the most preferred embodiment, a means is provided to repair the environment within the dry tomb. To form a verifiable and repairable preserved biolandfill for biological carbon sequestration, at least two sealable pipes or conduits are incorporated into the biolandfill design. For repair, these sealable pipes or conduits are opened to purge water vapor and any other unwanted gas species from the dry tomb structure encasing the salt biomass composite. By purging with relatively dry gas in a manner such that dry gas is flowed into one pipe or conduit and moist gas exits from the other, a portion of the dry tomb structure can be dried. This provides a means of drying and hence repairing (if needed) the biomass storage condition in the biolandfill. In one embodiment sealable pipes or conduits connecting to the earth's surface run coaxially and the purge between them flows predominantly in a vertical direction. In another embodiment two or more sealable pipes or conduits are spatially separated and when opened for purging, the purge direction has a significant horizontal component. This type of dry purge is not a feature of municipal landfills all of which store moist waste. Gas composition measurements are ideally taken during purging and should be designed to assess $CO_2$, methane, and water vapor concentrations in the gas exiting the biolandfill. As such, at least one gas analyzer should be either temporarily connected or permanently installed on at least one of the pipes or conduits. The connection can be such that all gas or a portion of gas flowing out of a sealable pipe or conduit flows through the analyzer. A wide variety of gas analyzers are commercially available and in some instances analyzers that measure a subset of CO2, methane, and water vapor can be used. When an analyzer is used that measures a subset of $CO_2$, methane, and water vapor, it is preferred to utilize an additional analyzer that completes the entire measurement set (i.e.
$CO_2$, methane, and water vapor). In addition, it is advantageous to measure the gas flow rate out of any pipes or conduits as well as the purge flow rate of gas into any pipes or conduits. Most of the time gas is not being purged or sampled and in this state the pipes or conduits are closed off from the earth's atmosphere. With two or more sealable pipes or conduits connecting the interior of the dry tomb to the earth's atmosphere, the environment in the biolandfill is aerobic after construction and transitions to a mostly anerobic environment over a period of time with a portion cycling between aerobic, anoxic, and anerobic conditions due to air ingress during gas sampling, or purging, or from potential remediation operations.

In one embodiment verification is done by measuring pressure in a closed sealable pipe or conduit to assess if any gas is being evolved from the entombed biomass. In this embodiment a readable analog or digital pressure gauge is installed on at least one of the sealable pipes or conduits. It is preferred that the accuracy of the pressure gauge be bar and more preferably 0.001 bar. Range of the pressure gauge should be at least from 1 to 1.2 bar, more preferably from 0.75 to 2 bar. Additionally, gas composition can be measured to assess amounts of $CO_2$ or methane gas being generated.

In another embodiment biomass in the dry tomb structure is compartmentalized with secondary or tertiary water barriers encasing the partitioned biomass. This arrangement provides additional protection to keep biomass dry during construction of the biolandfill as well as during the lifespan of the dry tomb structure. In another embodiment if too much unwanted decomposition of the entombed biomass occurs the biogas generated is allowed to flow out of the landfill and utilized in a combustion process or processed so that at least a portion of greenhouse gases evolved are captured and sequestered. An optional embodiment has a pipe running to the base of the dry tomb structure which can be used to pump out small amounts of liquid water or brines that are not expected but might accumulate if there are problems or defects in the biolandfill construction.

A notable aspect of the invention is biomass storage in the dry environment within the biolandfill which prevents rapid degradation and the evolution of greenhouse gasses. As noted above, the prior art has inadequately addressed greenhouse gas generation and monitoring. Proposals for simple in ground storage of biomass have been shown to be net greenhouse emitters rather than a carbon negative solution. Groundwater invades and supports growth of microorganisms that degrade the biomass and generate greenhouse gasses. A measurement of the moisture condition that allows microorganisms to grow is water activity. Water activity ($a_w$) is defined as the ratio of the water vapor pressure in gas equilibrated with the biomass to the saturated vapor pressure of pure water at the temperature of the stored biomass. Expressed as a percentage or fraction (ranging from about 0 to 1) of the saturated vapor pressure this is approximately the relative humidity. As such, a water activity ($a_w$) of 0.80 is approximately the same as a relative humidity of 80% which means the water vapor partial pressure in atmospheric pressure gas is 80 percent that of pure water. In aerobic environments a water activity above 0.95 will provide sufficient moisture to support the growth of bacteria, yeasts, and mold. Decreasing the water activity ($a_w$) inhibits the growth of such organisms. For food stored in aerobic environments if the water activity is controlled to 0.85 or less in the finished product the growth of organisms is sufficiently reduced so that it is not subject to the US Food and Drug regulations 21 CFR Parts 108, 113, and 114. As the water activity decreases further fewer and fewer life forms can grow. Decreasing water activity ($a_w$) below ~0.61 has been shown to extinguish life (A. Stevenson et. al., "*Is there a common water-activity limit for the three domains of life?*" The ISME Journal 9, 1333-1351, 2015). Metabolism rates also decrease with decreasing water activity. The reason that life forms become less viable as water activity decreases is that to support life cells must transfer water solubilized nutrients inwards through the cell wall and water solubilized waste materials out through the cell wall. Water content strongly bound to specific sites does not act as a solvent and only free or mobile surface sorbed water can solubilize nutrients and waste. As the water activity decreases water only populates strongly bound sites such as hydroxyl groups of polysaccharides, the carbonyl and amino groups of proteins, and others on which water can be held by hydrogen bonding, by ion-dipole bonds, or by other strong interactions. This binding action is referred to as sorption behavior and can be quantified by measuring water sorption isotherms. This same basic behavior also occurs in anoxic and anaerobic environments. Although the microorganisms that live in anoxic and anaerobic environments can be different from those living in aerobic environments, they still require the transport of water solubilized nutrients and waste products across cell walls. As such the definition of a dry environment will be the same for aerobic, anoxic, and anaerobic environments.

Over time water activity will thermodynamically equilibrate throughout most of the volume in a sealed dry tomb structure. This equilibration produces identical activities for water sorbed in the biomass, water vapor in the gas space, and water sorbed or deliquesced by salt or any water stored in brines. As such sampling the gas space from a dry tomb structure that has had time to equilibrate provides a means of measuring water activity. An equilibration time is taken to be six months, preferably a year, and more preferably 2 years. A dry environment is defined herein to be a water activity in gas sampled from the biolandfill of less than 0.85, preferably less than 0.80, more preferably less than 0.775, even more preferably less than 0.75, very preferably less than 0.65, and most preferably less than 0.6. When the biomass placed into the biolandfill has been dried so that its water activity is less than that required for a dry environment, salt biomass composites with a minimum amount of salt can be used for preservation.

Water activity in the dry tomb structure within the biolandfill can be assessed by measuring water content in gas flowed out of a sealable pipe or conduit that has been opened. When gas sampling is done while flowing a purge through the dry tomb, measurements should preferably be taken when the volume of gas flowing out of the biolandfill is more than 0.0001 of the dry tomb volume and less than one tenth of the dry tomb volume. The lower bound for volume of gas flowed is set to make sure sufficient gas has flowed through the pipe or conduit being sampled. The upper bound is set by the desire to have a purge displace gas from the biolandfill without breaking through to the pipe or conduit being sampled. In a more advanced protocol breakthrough is assessed using a molecular marker species introduced into the purge gas that can be detected by a gas analyzer. In another advanced protocol the gas composition is sampled before there is time to equilibrate (i.e. less than 6 months since the previous sample) and a molecular transport model is used to assess the water activity. In another advanced protocol the time dependence of water vapor concentration flowing out of a biolandfill is used to assess the water activity with the aid of a model. If the gas composition is sampled without using a purge, then to obtain a representative sample a volume of gas should flow out that is 3 times the volume of the pipe or conduit used for sampling.

The hydroscopic and deliquescent nature of salt in the composite encased within the dry tomb reduces the activity of water that may ingress during construction or after sealing of the dry tomb structure. Dry salt absorbs water (hydrates or deliquesces) and when there is sufficient thermodynamic water activity salt dissolves and forms solutions, removing water from the environment in which it is placed. Hydrated or deliquesced salt will be referred to as solid salt. In all states (solid or brine) salt draws and stores water molecules that otherwise would be free water or water sorbed into the biomass. The ability of salt to lower water activity is one of the reasons that NaCl has been commonly used as a food preservative. In addition, it is a disrupter that wreaks havoc in microbes that degrade food, interrupting their enzymes and chipping away at their DNA. The way in which salt is incorporated into the dry tomb is very different from the way it is used in food preservation. The biomass salt composite placed into the dry tomb structure has salt distributed homogeneously or heterogeneously in the biomass, which is not the way salt is used in food preservation. In a preferred embodiment the salt is distributed as a solid. Foods are preserved by soaking in a brine solution or by rubbing salt on the surface. For biolandfills salt levels and compositions that would not be acceptable for human consumption can be utilized to provide protection against water ingress during construction or long-term sequestration.

FIG. 1 presents a graph showing water sorption isotherms for two salts (NaCl and $MgCl_2$) that can reduce water activity to the point that biomass salt composites formed from them would be suitable for long-term sequestration. These salts are produced in large quantity and commonly used for road surface deicing. Isotherms in FIG. 1 show $H_2O$ uptake at 25 C in salt water mixtures as activity of water is increased in units of:

Weight fraction of $H_2O$ sorbed=mass $H_2O$/(mass $H_2O$+mass dry salt)     Eq. S1.1

This type of isotherm measurement is often referred to as an adsorption branch isotherm and differs slightly from desorption branch isotherms measured as the water activity is decreased in mixtures of salt and water. As the water activity increases from 0, no significant amount of water is sorbed until the water activity approaches the solubility limit. In the region where there is no significant amount of sorbed water ($a_w$=0 to <0.33 for $MgCl_2$ or $a_w$=0 to <0.75 for NaCl) there can be hydrated or deliquesced salt. Close to the solubility limit, water content abruptly rises (or equivalently salt concentration decreases). In this region near the solubility limit where the water content abruptly rises there can be hydrated or deliquesced salt, saturated brine, or supersaturated brine. Values of water activity in this region near the solubility limit where the water content abruptly rises are approximately 0.33 for $MgCl_2$ and about 0.75 for NaCl. The solubility limit has very little temperature dependence changing by less than 2% in a temperature range from 10° C. to 50° C. As such water sorption isotherms for these salts are very similar in the temperature range from 10° C. to 50° C. A consequence of this is that the lowest water activity that can be achieved with $MgCl_2$ addition is ~0.33 and the lowest water activity that can be achieved with NaCl addition is ~0.75. Other examples of common salts having saturated or supersaturated brines and deliquesced solids with water activities in preferred ranges that can be used for long term biomass storage are KCl ($a_w$ at saturation about 0.85), LiCl ($a_w$ at saturation about 0.11), $K_2CO_3$ ($a_w$ at saturation about 0.44). In addition, $CaCl_2$ is a common salt used for road deicing that can be used to lower water activity below about 0.2, however its behavior is somewhat more complex because it is extremely hydroscopic. Incorporating a sufficient quantity of salt capable of reducing $a_w$ below 0.6 provides a way of lowering water activity into the most preferred range for long term biomass storage. Salts capable of this would include $CaCl_2$, $MgCl_2$, $K_2CO_3$ and $LiCl$. NaCl on it's own cannot reduce $a_w$ below ~0.75.

Incorporating a sufficient quantity of these salts provides a way of lowering water activity into the preferred ranges ($a_w$<0.85, $a_w$<0.80, $a_w$<0.775, $a_w$<0.75, $a_w$<0.65 and $a_w$<0.6) for biomass storage. The precise amount of salt needed is determinable by the skilled practitioner, by the type of salt, target water activity, as well as total amount of water and biomass within the dry tomb structure. Biomass acts as a water sorbent and example isotherms are shown in FIG. 2. Isotherms in FIG. 2 show $H_2O$ uptake at 25 C in various biomasses as activity of water is increased in units of:

$$\text{Weight fraction of } H_2O \text{ sorbed} = \text{mass } H_2O \text{ sorbed}/\{\text{mass } H_2O \text{ sorbed} + \text{mass dry biomass}\}) \qquad \text{Eq. 3}$$

It should be noted that these units are similar to the units used for the water salt isotherms shown in FIG. 1 and that the weight % of sorbed water is equal to 100 times the weight fraction of sorbed water. Another similarity to the isotherms in FIG. 1 is that these are adsorption branch isotherms which differ slightly from desorption branch isotherms measured as the water activity is decreased. The adsorption isotherm for miscanthus (a highly productive energy crop) is shown over a full range of water activity. At very low water activity ($a_w$<0.02) the water loading rises sharply due to water populating strongly bound sites. In the region of interest for biomass storage ($a_w$ ranging from 0.05 to the amount of sorbed water rises gradually from about 5 wt. % to ~20 wt. %. At higher water activity ($a_w$>0.85) loading of water rises much more rapidly due to filling of mesopores and macropores in miscanthus. The salt and biomass isotherms allow one to compute the minimum amount of salt required to maintain a desired water activity in the dry tomb structure. For example, if the desired water activity is 0.85 and the temperature of the dry tomb structure is 25° C. then the amount of highly dispersed NaCl needed to dry and store one tonne of miscanthus having an initial water content of 25 wt. % would be about 0.02 tonne of dry NaCl salt (with no provision for water ingress).

In a second example, if the desired water activity is 0.33 and the temperature of the dry tomb structure is 25° C. then the amount of highly dispersed $MgCl_2$ needed to dry and store one tonne of miscanthus having an initial water content of 20 wt. % would be about 0.03 tonne of dry $MgCl_2$ Salt (with no provision for water ingress).

In a third example if the desired water activity is 0.33 and the temperature of the dry tomb structure is 25° C. then the amount of highly dispersed $MgCl_2$ needed to dry and store one tonne of miscanthus having an initial water content of 20 wt. % and a water ingress of 0.055 tonne would be about 0.06 tonne of dry $MgCl_2$ Salt.

FIG. 2 also shows water adsorption isotherms covering the region of interest for long term sequestration of prairie cordgrass and hardwood. The hardwood isotherm is an average for ten different hardwoods (Red Oak, White Oak, Yellow Poplar, Sweetbay, White Ash, Green Ash, Red Maple, and American Elm). It is seen that in the region of interest of water activity for biomass storage, the isotherms are qualitatively similar to miscanthus. This qualitative similarity extends to most other forms of biomass in part because the isotherm in this region is set by water adsorption into mesopores and some macropores. There is a modest temperature dependence for the thermodynamics of adsorption into mesopores and micropores and FIG. 3 illustrates this with 20° C., 25° C., and 40° C. miscanthus water adsorption isotherms. It is seen that a significant portion of the difference between them comes from the temperature dependence of strongly adsorbed water that governs shape of the isotherm at low water activity ($a_w$<0.02). As such with a limited number of isotherms one can make quantitative estimates of the biomass dryness level required and the amount of salt needed to store dried biomass at a given water activity. Salt requirements are lowered by drying biomass as set forth herein.

Although the definition of a dry environment is the same for aerobic, anoxic, and anaerobic environments, there are key metabolic differences in organisms that live in aerobic, anoxic, and anaerobic environments. A consequence of these metabolic differences is that $CO_2$ is emitted as a greenhouse gas from aerobic biomass degradation while anaerobic and anoxic environments produce a mixture of $CO_2$ and methane (which is a ~25 times more potent greenhouse gas). As such it is an aspect of the present invention to keep a dry environment in anoxic and anaerobic portions of a biolandfill.

To keep biomass dry, at least one water transport barrier contained within the top and bottom seals that are joined together surrounds the biomass. The outermost extremities of the top and bottom seals delineate the biolandfill's dry tomb structure. In a preferred embodiment an additional water transport barrier is located within the top and bottom seals. This additional barrier surrounding the biomass is conformally enclosed within the first (or outermost) water transport barrier. An advantage of this nested dual barrier structure is that it mitigates and/or eliminates the effect of pinholes or defects in the outermost water transport barrier. In an even more preferred embodiment three or more water transport barriers are nested separating the ground and ground water from the biomass. For all nested water transport barriers spacer or separating structures (layers or regions) can be used to set apart (i.e. separate) the nested water barriers. A spacer or separating structure can contain soil, compacted soil, clay, geosynthetic clay, a geotextile, a geonet, or a geosynthetic fabric. In some instances a high-capacity water sorbent is incorporated into the spacer structure. In other embodiments multiple high-capacity water sorbent materials are incorporated into the spacer structure. A high-capacity water sorbent is taken to be a sorbent that when exposed to fresh liquid water, the sorbent loading exceeds 0.5 gram of water per gram of dry sorbent material. Examples of high-capacity water sorbents are superabsorbent polymers. Thickness of a layer, region or structure separating water transport barriers can range from about 0.1 centimeter to about 3 meters and more preferably about 10 centimeters to about 1 meter.

The only way for water to cross any defect free water transport barrier is by slow diffusion (i.e. no convective transport). The rate at which water diffuses through a material or membrane can be quantified by measuring the Water (Or Moisture) Vapor Transmission rate which is the amount of water passing through a given surface area per unit time from one side of the material where there is high water activity (saturated or nearly saturated) to an opposite side where there is a low water activity (dry or nearly dry). Units for Water (Or Moisture) Vapor Transmission rates are $g/m^2$/day and measurements of this quantity are used in many industries where moisture control is critical for example packaging for foods and pharmaceuticals. In the USA, g/100 in²/day is also in use, which is 0.064516 (approximately ¹⁄₁₅) of the value in g/m²/day units. The Water (Or Moisture) Vapor Transmission Rate depends on temperature and water activity. For a metric, we refer to measurements at 38 C and a water activity in a range of 0.9 to 1.0 on one side of the material diffusionally transporting to the opposite side where the water activity is 0.05 or less. The Water (Or Moisture) Vapor Transmission rates of water transport barriers in these test conditions should be in a range of 0.0 to 0.5 g/m²/day, more preferably in a range from 0.0001 to 0.2 g/m²/day, even more preferably in a range from 0.001 to 0.1 g/m²/day and most preferably in a range from 0.002 to 0.05 g/m²/day. Under these measurement (i.e. test) conditions a water transport barrier with a Water (Or Moisture) Vapor Transmission rate of 0.05 g/m²/day would deliver an amount in one year equivalent to an 18 micron thick film of water covering the surface of the barrier material. In service the biolandfill temperature would be less than the test condition and the water activity difference across the barrier would be significantly less reducing the amount of water delivered by a factor ranging from 2 to 200 when the rate of delivery in the test condition is compared with that in a dry tomb structure. Under test conditions Water (Or Moisture) Vapor Transmission Rates are inversely proportional to the thickness of the barrier material (i.e. doubling thickness reduces Water (Or Moisture) Vapor Transmission Rates by a factor of 2). If there are two nested barriers with each having the same permeance as a single barrier, the water delivery rate would be reduced by a factor of 2 if there were no mass transfer resistance in the region between them. In a preferred embodiment within the seal structures there is a spacer structure separating the nested water transport barriers which offers significant mass transfer resistance. Depending on design this will lower the water transport rate by an additional factor of 1.5 to 4. Materials that under test conditions have Water (Or Moisture) Vapor Transmission Rates in the preferred range for practice of this invention are plastics that include 1 to 300 mil (1 mil=0.001 inch) thick sheets of low-density polyethylene, linear low-density polyethylene, high-density polyethylene, polypropylene, polyester, and oriented polyester. Preferred materials are plastic sheets formed from 0.91 to 0.94 g/cc low-density polyethylene resins and high-density polyethylene resins having densities of 0.94 g/cc or greater. These materials have been extensively used in municipal landfills and can be readily joined to prevent leaks between sheets by a plastic welding process. Presently, municipal landfill GM-13 specifications cover the use of products usually made from 0.91 to 0.94 g/cc low-density polyethylene resins and GM-17 specifications cover the use of products usually made from high-density polyethylene resins with densities of 0.94 g/cc or greater. Historically the higher density polyethylene (GM-17) has had the advantage of greater chemical resistance and the lower density polyethylene (GM-13) has had superior environmental stress crack performance. Preferred thickness of sheets made from low-density polyethylene resins and high-density polyethylene resins are in a range from 10 to 300 mil thick, even more preferably in a range from 20 to 150 mil thick and even more preferably in a range from 40 to 80 mil thick. Clay layers (in particular bentonite) with thickness of 0.2 to 2 meters have Water (Or Moisture) Vapor Transmission Rates in the target range, however they are less preferred as a water transport barrier. Significant performance degradation of clay layers has been found in field settings. Degradation of clay barrier properties has been traced to several factors including exchanging Na ions with Ca ions in the clay structure and cyclic hydration and dehydration of the clay cap from weather and other events which leads to cracking. Thin (0.01 to 0.4 meter thick) clay or geosynthetic clay layers have an advantageous use when incorporated in layers separating water transport barriers or between the innermost water transport barrier and the biomass. In this role the clay layer acts as a water sorbent removing small quantities of water crossing the water transport barrier, as well as a weak diffusion barrier inhibiting water transport, and a swelling agent that seals any pinholes in the water transport barrier. Clays can also be used to seal overlaps in plastic sheeting that are not sealed with a thermal welding process. Superabsorbent polymers can be used in a spacer structure separating nested water transport barriers to hinder water transport. Superabsorbent polymers can adsorb an amount of water that is 100-300 times their dry weight. An example of a superabsorbent polymer is Na polyacrylate. Other examples are cross-linked polyacrylates and polyacrylamides; cellulose- or starch-acrylonitrile graft copolymers; and cross-linked maleic anhydride copolymers.

Base of the dry tomb structure in the biolandfill is taken to be approximately the lowest position of any of the water transport barriers. This base can be located below the surface of the earth as would be the case in a municipal landfill, or near or at the surface of the earth. Top surface of the dry tomb structure in the biolandfill is taken to be the uppermost surface of any of the water transport barriers and this surface is usually above the surface of the earth. Maximum thickness in the vertical direction of the salt biomass composite between the innermost water transport barriers in the dry tomb structure is at least 5 feet, preferably greater than 25 feet, even more preferably greater than 50 feet, most preferably greater than 100 feet and less than 2,500 feet. Maximum lateral extent of the salt biomass composite in the dry tomb structure between the innermost water transport barriers measured in a plane perpendicular to the vertical is greater than 10 feet, preferably greater than 100 feet, more preferably greater than 1,000 feet and less than feet. As such, volume of the salt biomass composite enclosed in the dry tomb is greater than 355 feet³ (or 10 meter³), preferably greater than 3,550 feet³ (or 100 meter³) and more preferably greater than 35,550 feet³ (or 1,000 meter³). In a preferred embodiment the base of the dry tomb structure is sloped so that any liquid water collecting in the structure would drain to one end or more preferably a point where a pipe or conduit can be used to remove the liquid water. To aid in the drainage perforated or porous pipes or conduits running laterally can be placed close to the surface of the innermost water transport barrier at the bottom of the dry tomb structure. Ideally a laterally running pipe or conduit drains water to a place where it can be collected or accessed by a vertical pipe running to the surface of the biolandfill.

The top surface of the dry tomb structure in the biolandfill is preferably covered with a thick layer of soil to protect the dry tomb, isolating it from damage by the earth's environment (oxidation from air, rainstorms, roots from plants and trees, lightning . . . ). Thickness of the layer of soil covering the dry tomb is preferably at least 2 meters, more preferably greater than 5 meters, and most preferably greater than 10 meters. In a preferred embodiment the top surface of the dry tomb structure is covered with a geonet, geomembrane, geotextile, geocomposite, or other protective sheet to drain water and mechanically protect the outermost water transport barrier. It is also preferred to have the first meter of soil that covers the top surface of the dry tomb to be free of large rocks or boulders. In a preferred embodiment the top surface of the soil that is exposed to the earth's atmosphere has grasses, plants, or shallow rooted trees growing on it to prevent erosion.

In a preferred embodiment at least one sealable solid wall pipe or conduit runs from the interior of the dry tomb structure through the layer of soil covering the tomb to the earth's atmosphere. In other preferred embodiments two or more sealable solid wall pipes or conduits run from the interior of the dry tomb structure through the layer of soil covering the tomb to the earth's atmosphere. In some instances, sealable solid wall pipes or conduits will be referred to as sealable pipes or conduits and in all instances, there is some means to open and close them. A preferred embodiment seals these pipes or conduits with valves that can be opened and closed; however several other removable sealing methods can be used including screwed on caps, caps affixed to flanges, and other means of mechanically attaching removable caps. For each sealable solid wall pipe or conduit there is at least one watertight seal to the water transport barrier preventing water ingress. In a preferred embodiment at any place a pipe or conduit contacts a water transport barrier there is a substantially watertight seal to the water transport barrier preventing water ingress. This sealing keeps the integrity of the water transport barrier intact. Sealing can be done by processes such as thermal welding, gasketing, or gluing. Sealable solid wall pipes or conduits running from the interior of the dry tomb structure through the layer of soil covering the tomb to the earth's atmosphere should have low permeability to water, excellent resistance to corrosion, and excellent mechanical properties. An example of a material meeting these requirements is PVC pipe. Sealable solid wall pipes or conduits must protrude into the dry tomb and contact gas therein. It is preferred that the sealable solid wall pipes or conduits extend into the dry tomb structure at least 2 inches below the top of the innermost water transport barrier, more preferably more than a foot below the top of the innermost water transport barrier. In another preferred embodiment at least one of the sealable solid wall pipes or conduits extends within 4 feet of the innermost water transport barrier near the bottom of the dry tomb structure, more preferably within 2 feet of the innermost water transport barrier near the bottom of the dry tomb structure, and most preferably within 1 foot of the innermost water transport barrier near the bottom of the dry tomb structure. Sealable pipes or conduits have an end protruding above the dirt layer covering the dry tomb structure where there is an atmospheric seal that can be occasionally opened so that gas from the interior of the dry tomb can be sampled/or purged. With two or more sealable solid wall pipes or conduits, a flowing purge introduced into at least one of the sealable pipes or conduits can be used to sweep gas out of the dry tomb structure into a sealable pipe or conduit that has been opened to collect gas, or vent gas, or sample gas composition. When opened, sealable pipes or conduits connecting to the atmosphere at the earth's surface will supply some oxygen into the pipe or conduit and as such a portion of the biolandfill cycles between anaerobic, anoxic, and oxidative conditions unless oxygen is rigorously excluded from the sealable pipes or conduits. It is very difficult to rigorously exclude oxygen. In principle this can be done by installing valving that purges dry nitrogen into the sealable pipes or conduits. This would increase operating expenses, and in most circumstances, it is preferred to use dry or low humidity air to purge the sealable pipes or conduits running from the earth's atmosphere into the dry tomb structure. Atmospheric air can be used as long as at the temperature of the landfill the relative humidity in the air purge is less than 60%, preferably less than 40%, even more preferably less than 20% and most preferably less than 10%. If an atmospheric air purge is used portions of the biolandfill will become oxidative, and over time cycle to an anoxic and potentially anerobic condition.

Within the dry tomb structure pipes or conduits may be perforated or may be porous to gather gas from different depths or zones. In most instances these perforated or porous pipes or conduits are connected (or joined) to the sealable solid wall pipes or conduits running from the interior of the dry tomb through the covering protective dirt layer to the earth's atmosphere. Perforations or porosity may be in zones or may be over a long continuous length. Nonlimiting examples of perforations are holes or slots in the pipe running within the dry tomb structure. Porosity can be imparted by making a length of pipe or conduit out of a mesh or screen structure. It is also possible to have one or more pipes running coaxially within an outermost pipe in a similar fashion to multiple completion oil and gas wells. Multiple completion oil and gas wells can isolate production from multiple oil or gas bearing zones (different depths) using parallel tubing strings within a single wellbore casing string. In a biolandfill this type of technology would allow a single pipe or conduit with one or more pipes or conduits coaxially contained therein to purge the dry tomb structure sweeping gas to the surface. It could also be used to allow measurement of gas production from different zones (or depths) in the dry tomb structure or to remove liquid water that might accumulate in the dry tomb structure. This is especially advantageous when the biomass salt composite in the dry tomb structure is compartmentalized with secondary or tertiary water barriers encasing the partitioned biomass salt composite. In a more preferred embodiment, there are multiple spatially separated sealable solid wall pipes or conduits running from the interior of the dry tomb structure through the water barrier or barriers and layer of soil covering the tomb to the earth's atmosphere. This arrangement allows when opened one or more sealable pipes or conduits to be used to inject gas into the dry tomb structure and one or more sealable pipes or conduits to be used to collect or sample gas that has flowed predominantly in a horizontal direction across a portion of the tomb. With this arrangement it is then possible to purge selected regions within the dry tomb structure as well as produce an approximate map of where any biogas is being generated. By locating sealable pipes or conduits far apart large volumes within the dry tomb can be purged. This allows an effective restoration and repair of the atmospheric condition in a significant portion of the dry tomb structure. Restoration and repair is accomplished by purging with low humidity gas that exits to the atmosphere as a moist gas, lowering the water content in the dry tomb structure. To lower gas pressure drop during purging it is possible to have perforated or porous pipes or conduits running laterally in the dry tomb structure. It is also possible to configure multiple pipes or conduits to access different depths (or zones). This is particularly advantageous when biomass in the dry tomb structure is compartmentalized with secondary or tertiary water barriers encasing the partitioned biomass.

To measure gas composition in the biolandfill it is preferred to have gas flow out of an opened sealable pipe or conduit running to the surface where it can be sampled with analytical instrumentation. Analytical instrumentation is connected to sealable pipes or conduits in order to measure $CO_2$, methane, and water vapor compositions. Purging pipes or conduits allows a representative measurement of gas composition within a dry tomb structure. If the biolandfill is correctly constructed and operated, the buildup of gas pressure from biomass decomposition will be small so that when a sealable pipe or conduit is opened very little gas will flow and a purge will be needed to accurately measure composition within the biolandfill. To provide a more continuous measurement of gas generation, pressure in a sealable pipe or conduit can be recorded while the biolandfill is sealed off from the earth's atmosphere. If the sequestered biomass begins to degrade, a purge to repair the atmospheric environment in the dry tomb can be started and, in some extreme cases, liquid water can be pumped to the earth's surface from the base of the biolandfill. Should the reparation fail to arrest unwanted biomass decomposition, the sealable pipes or conduits can be used to gather and route biogas to a processing facility where it is separated or combusted or both. Ideally a separation process would capture and sequester $CO_2$ from the unwanted flow of biogas.

Biomass composited with salt can be harvested plants or trees, or chemically altered biomass left over as a waste product from chemical conversion processes. Chemical conversion technologies that produce biomass-derived waste include torrefaction, carbonization, anaerobic digestion, and biofuel production. All these chemically altered waste materials along with harvested plants or trees will be referred to as biomass.

From an economic standpoint, it is preferred to generate the harvested feedstock from high productivity plants and trees (often referred to as energy crops) with dry biomass yields in a range from 1 to greater than 20 metric dry tons per acre per year. It is also preferred that the biomass sequestered not be a food crop such as corn, wheat, or other similar plant materials. A partial listing of crops that are suitable to produce biomass for the present invention is presented in Table 1. The wide range of crops shown in Table 1 increases the breadth of applicability because these feedstocks can be grown in diverse climates throughout the world. In addition, many of these crops can be grown on marginal or degraded lands with reduced yields. In some instances compromised soil and/or irrigation may be employed in the generation of the biomass. Weight fraction of carbon in the dry biomass of plants listed in Table 1 ranges from approximately ~40 wt. % to ~55 wt. %. If the biomass is simply harvested and sequestered in a biolandfill this would offset ~1.3 to ~1.8 metric tons of $CO_2$ per metric ton dry biomass sequestered.

TABLE 1

Candidate Biomass Crops

| Classification | Technical Name | Common Names |
| --- | --- | --- |
| Herbaceous Grass | Miscanthus | Miscanthus x giganteus, Silvergrass |
| Herbaceous Grass | Panicum virgatum | Switchgrass |
| Herbaceous Grass | Pennisetum purpureum | Elephant Grass Napier Grass, Uganda Grass |
| Herbaceous Grass | Arundo donax | Giant Reed, Indian Grass, Spanish Reed |
| Hybrid | Miscanthus x Sugarcane | Makarikari Grass |
| Nitrogen Fixing* | Pueraria** | Kudzu, Japanese Arrowroot |
| Nitrogen Fixing* | Medicago sativa | Alfalfa |
| Woody | Bambusoideae | Bamboo |
| Short Rotation Coppice | Salix | Common Osier, Basket Willow, Willow |
| Short Rotation Coppice | Populus | Poplar, Hybrid poplar, Eastern Cottonwood |
| Short Rotation Coppice | Eucalypteae | Eucalyptus, Gum Tree |
| Hybrid Tree | Transgenic Trees | Transgenic Eucalyptus |
| Tree/Shrub | Acacia | Mimosa, Acacia, Thorntree, Wattle |
| Tree | Pinus | Pine, Loblolly Pine |
| Aquatic | Seaweed | Kelp |
| Herbaceous Plant | Agave tequilana | Blue agave, Tequila agave, |
| Herbaceous Plant | Saccharum | Energy Cane, Sugarcane |

Algae is an additional high yield biomass that could be used however it requires special growth and harvesting techniques and a very high level of dryness for preservation because of its composition.

To help ensure dryness the biomass (either harvested or chemically altered) should be relatively dry when composited with salt. If there is too much free or sorbed water in the biomass an excessive amount of salt will be needed to keep the water activity in the sealed biolandfill low enough so that the biomass does not degrade. To meet this requirement it is preferred that the water content of the completed dry tomb structure is less than 30 wt. % of the dry weight of biomass encased within the tomb, in a preferred embodiment the water content of the dry tomb structure is less than 20 wt. % of the dry weight of biomass encased within the tomb, in a more preferred embodiment the water content of the dry tomb structure is less than 10 wt. % of the dry weight of biomass encased within the tomb, in an even more preferred embodiment the water content of the dry tomb structure is less than 8 wt. % of the dry weight of biomass encased within the tomb, and in the most preferred embodiment the water content of the dry tomb structure is less than 6 wt. % of the dry weight of biomass encased within the tomb. Lower water contents leads to lower water activity in the biolandfill and in all cases it is preferred to dry the biomass as much as practical before loading it in the biolandfill. Harvested or chemically altered biomass can have water contents well above the required or preferred range and drying processes are often required. For example, harvested green wood (such as loblolly pine) can have water contents ranging from 40 wt. %. to 60 wt. %. Approximately ⅔ of this water is located in macropores and larger mesopores that can be emptied by air drying leaving 15 wt. % to 20 wt. % adsorbed water after an air-drying process. Many other biomasses have water located in macropores that can be readily removed by air drying. It is preferred to remove as much water as possible with solar, air drying, or a combination of both. More strongly sorbed water that is left after solar or air drying of different biomasses is generally in a range from 7 wt. % to 25 wt. %. It is generally preferred to remove a fraction of the somewhat more strongly sorbed water with a heated drying method to meet dryness specifications for the biolandfill. Heated drying methods include heated shed dryers, belt dryers, tunnel dryers, trough dryers, conveyor dryers, rotary drum dryers, screw conveyed dryers, hearth dryers, moving bed dryers, and fluidized bed dryers. Heated drying techniques can reduce the water content well below 1 wt. % but require capital investment and energy costs. As such there is an optimization in any heated drying process between cost (capital and operating) of heated drying and the amount of water sorbed into the dried product. Reducing the amount of water in the sorbed product provides a safety margin below the level at which degradation occurs. In a preferred embodiment optimization of solar drying, air drying and/or heated drying processes produce a biomass product with 1 wt. % to 30 wt. % water content, preferably 2 wt. % to 15 wt. % water content, and even more preferably 3 wt. % to 10 wt. % water content. Additionally, it may be preferred to chop the biomass into smaller pieces before drying. Chopping into millimeter to multi-centimeter sized pieces can facilitate handling and drying. A preferred method for drying chopped biomass is with a rotary dryer. For a rotary drier it is preferred to produce a product with 2 wt. % to ~10 wt. % water in the biomass which for most biomass isotherms corresponds to a water activity (or dryness level) that would not support life. At these low water activities which will not support most life forms, minimum amounts of salt can be used in forming the salt biomass composite.

As was previously noted the amount of salt needed (i.e. added) to obtain a level of dryness (or target water activity) in the dry tomb structure depends on salt composition, the type of biomass being sequestered (which sets the biomass water adsorption isotherm), level of biomass dryness, as well as expected water ingress during construction and sequestration. The amount of salt required increases with water content in the biomass and the amount of water ingress. In general, for very dry biomass (approximately 2 wt. % to 10 wt. % water content) with a low level of water ingress (construction plus sequestration plus water in salt brines) of approximately less than 2 wt. % of the dry biomass, the average salt content (salt weight counting solids and salt in brines) in the dry tomb structure should be at least 0.0001 wt. % of the dry weight of the biomass, preferably at least 0.001 wt. % of the dry weight of the biomass, even more preferably at least 0.01 wt. % of the dry weight of the biomass, very preferably at least 0.1 wt. % of the dry weight of the biomass, and most preferably at least 0.5 wt. % of the dry weight of the biomass. As such a working definition of the salt content in a salt biomass composite is an average salt content (salt weight counting solids and salt in brines) in the dry tomb structure of at least 0.0001 wt. % of the dry weight of the biomass, preferably at least 0.001 wt. % of the dry weight of the biomass, even more preferably at least 0.01 wt. % of the dry weight of the biomass, very preferably at least 0.1 wt. % of the dry weight of the biomass, and most preferably at least 0.5 wt. % of the dry weight of the biomass. For operating convenience, or for slightly larger amounts of water (adsorbed water in the biomass plus water ingress plus water in brines), the average salt content (salt weight counting solids and brines) within the salt biomass composite should be higher, approximately at least 1% of the dry weight of the biomass. With an even larger margin of operational convenience, or even larger amounts of water (adsorbed water in the biomass plus water ingress plus water in brines), the average salt content (salt weight counting solids and brines) within the composite should be at least 2 wt. %, or 5 wt. % or 10 wt. % of the dry weight of biomass within the dry tomb structure. From an economic perspective the average salt content (salt weight counting solids and brines) within the composite should be less than 75 wt. % of the dry weight of biomass within the dry tomb structure. For such a high salt content, the cost of salt becomes comparable or larger than the cost of biomass.

To enhance biolandfill economics it is preferred to locate biolandfills within 5 to 200 miles of agricultural or forestry sites sequestering 10 to 100,000 kilotonnes per year of dried biomass in each biolandfill. This highly distributed sequestration saves cost of transporting biomass large distances. It is also envisioned that any processing such as drying, compositing with salt, torrefaction, carbonization, anaerobic digestion, or production of liquid biofuels could be co-located with the biolandfill. These distributed biolandfills should be constructed to occupy a very small fraction of the land area used for crop production.

To minimize biolandfill footprint, biomass in the stored salt biomass composite can be compacted. Compaction has the added benefits of improving mechanical stability of the biolandfill, minimizing volumes that can hold free water and improving economics. In addition, compression limits mass transfer of water and water vapor into the salt biomass composite reducing rates of degradation. A metric for compaction is average bulk density of biomass in the salt biomass composite within the dry tomb which excludes mass contributions from salt as well as foreign substances such as soil, dirt, or plastic that may be intentionally placed in the dry tomb structure. In a preferred embodiment the average bulk density of compressed biomass in the salt biomass composite within the dry tomb is greater than 0.2 g/cc, in a more preferred embodiment the average bulk density of compressed biomass is greater than 0.5 g/cc, in an even more preferred embodiment the average bulk density of compressed biomass is greater than 0.75 g/cc, and in the most preferred embodiment the average bulk density of compressed biomass is greater than 1.0 g/cc. By comparison uncompressed biomass has a bulk density ranging from approximately 0.02 to 0.15 g/cc. With a biomass compaction in the range of 0.7 to 1.4 g/cc, a 100 foot vertical height in the dry tomb structure can store approximately 84,000 to 165,000 metric tons of biomass per acre. If harvested energy crops or wood are sequestered in dry tomb structures, on a yearly basis this would require approximately 0.005% to 0.01% of the land area used for agriculture or forestry.

Form factors for compressed salt biomass composites can be compressed bales or briquettes (bricks, sheets, pellets, or extrudates) placed into the biolandfill, or a mixture or jumble or layers of salt and biomass dumped into the biolandfill and compacted in place. Compressed bales or briquettes (bricks, sheets, pellets, or extrudates) can be comprised of a mixture of salt and biomass or pure biomass with salt added separately. Additionally, compressed bales or briquettes (bricks, sheets, pellets, or extrudates) can be packaged in plastic.

In a alternative embodiment the salt biomass composite is formed by pumping concentrated brine into a dry tomb structure encasing compacted biomass or a compacted salt biomass composite. When biomass is compacted in place it is preferred to place a 0.1 to 4 meter thick layer of biomass into a portion of the landfill, compact the layer, repeating the process over and over to generate a compacted fill. A salt biomass composite is formed by a later addition of salt or by incorporating salt with the biomass before it is compacted. Methods used to compact biomass in place include techniques to compact soils, such as dynamic, vibratory, and quasi-static compaction. Dynamic compaction is a ground improvement technique that densifies soils and fill materials by using a drop weight. The weights typically range from 6 to 30 tons (up to 40 tons), and the drop heights typically range from 10 to 30 meters (30 to 100 ft), sometimes more. Vibratory compaction applies a stress to soil or fill materials repeatedly and rapidly via a mechanically driven plate or hammer. Often this is combined with quasi-static compaction methods such as rolling compaction. Quasi-static compaction techniques are commonly used in municipal landfills and apply stress to the soil or fill material at a slower rate by rolling a heavy cylinder across the surface or by the kneading action of devices such as a 'sheepsfoot' roller. For all methods used to compact salt and biomass in place it is preferred to run multiple passes of the compaction equipment over the exposed surface in a manner similar to that used in soil and municipal waste compaction. Density of compressed bales is typically less than that produced by dynamic, vibratory, and quasi-static compaction. Bailing machinery is commonly used in agricultural production, compressing biomass into a block (bale) which is secured by plastic wrap or wire strapping. Compressed bales can be made from either a mixture of salt and biomass or biomass alone. If biomass alone is used than salt is separately added. Bulk densities of compressed bales depend on the type of machinery used and can range from approximately 0.15 g/cc to 0.35 g/cc. Higher density compression can be achieved with reciprocating ram/piston presses, screw presses, roll presses, and extruders that produce briquettes in the form of bricks, sheets, pellets, or extrudates. This type of machinery can produce compaction pressures of 5,000 psi to 50,000 psi. yielding compacted biomass briquettes as well as salt biomass composite briquettes with bulk densities ranging from 0.5 to 1.5 g/cc. When pure biomass briquettes are produced by compression, a composite with salt is formed in a later step. Forming pure biomass briquettes from small particulate miscanthus or switchgrass with densities ranging from 0.6 g/cc to 1.1 g/cc requires pressures ranging from 10,000 psi to 35,000 psi.

In a preferred embodiment briquettes in the form of compressed biomass or compressed composite salt biomass bricks, sheets, pellets, or extrudates are stacked together in a bundle and put in plastic bags or plastic wrapped. If pure biomass briquettes are made it is preferred to add salt to form a salt biomass composite that is held within the plastic bags or plastic wrapping. The purpose of the bags or plastic wrap is to aid in handling of the compressed biomass and to help keep the biomass dry during construction of the biolandfill. As such, in a preferred embodiment plastic bags or plastic wrapping is sealed so that liquid water cannot intrude into the enclosed biomass briquettes or composite salt biomass briquettes. Sealed plastic bags or sealed plastic wrapping form either a secondary or tertiary barrier to water transport. If there are secondary water transport barriers such as sealed plastic sheeting, the sealed plastic bags or sealed plastic wrapping would form tertiary water transport barriers. It is also preferred that the sealed plastic bags or plastic wrapping offer a resistance to mass transfer of water vapor and resist mechanical tearing or puncturing. Plastic resins that can be formed into bags or sheets meeting these requirements are low-density polyethylene, linear low-density polyethylene, polyethylene resins produced with metallocene catalysts, high-density polyethylene, polypropylene, and resin blends of these materials. Preferred thickness of bags or sheets is set by mechanical and economic considerations and is in a range from 1 mil to 20 mil and preferably in a range from 2 mil to 8 mil. Sealing to prevent water intrusion is done either by gluing or thermal sealing processes such as heat sealing or plastic welding. Mass of compressed biomass briquettes or compressed composite salt biomass briquettes (bricks, sheets, pellets, or extrudates) enclosed in a bag or plastic wrapping can be in a range from 10 to 2,000 pounds, more preferably in a range from 20 to 500 pounds and even more preferably in a range from 40 to 200 pounds. Heat sealing of commonly used 5 to 100 gallon sized trash bags provides an example of plastic bags that could be used to enclose and protect compressed biomass briquettes or compressed composite salt biomass briquettes (bricks, sheets, pellets, or extrudates). It should be noted that biomass briquette filled bags or plastic wrapped biomass briquettes are available as an item of commerce. In the practice of this preferred embodiment, a salt biomass composite is sequestered in the dry tomb structure which is either compressed biomass briquettes with salt added to the bags (or plastic wrapping), compressed salt and biomass briquettes held in bags (or plastic wrapping) or bagged (or plastic wrapped) biomass briquettes with salt added separately into the dry tomb structure. In another embodiment composite salt biomass briquettes are placed directly into the dry tomb structure without bagging or plastic wrapping. In yet another embodiment pure biomass briquettes are placed directly into the dry tomb structure without bagging or plastic wrapping and salt is added while the dry tomb is being constructed. Although not preferred, pure biomass briquettes can be placed directly into the dry tomb structure without bagging or plastic wrapping and a highly concentrated salt brine is pumped into the dry tomb.

There are a wide range of methods that can be used to construct biolandfills with the compositions and features that have been described. Construction techniques involve a wide variety of engineering and scientific practices such as construction engineering, environmental engineering, geotechnical engineering, materials science, materials engineering, site development and planning, structural engineering, surveying, water resource engineering, chemical and process engineering, analytical chemistry, pedology, agronomy, biology, and civil systems engineering. All of these disciplines are beneficial to construct biolandfill compositions and features that have been described. Only a few of the myriad of possible construction methods are specified herein, those skilled in the art will be able to devise a wide variety of methods of construction, meeting the requirements of the present invention. Methods used to construct biolandfills which have a base above or near the earth's surface may differ from construction methods which have a base well below the earth's surface. Biolandfill construction would begin by preparing a surface on which the bottom water transport barrier or barriers would be installed. If the biolandfill is below the earth's surface this would involve excavation of an open pit structure while for construction at the earth's surface this would primarily involve grading the surface of the land. Provision is also made to drain rainwater from the excavated or graded structures as well as from the biolandfill when it is being filled. In some instances, salt will be molecularly separated from the drained rainwater. Examples of processes that can molecularly separate salt are reverse osmosis, crystallization, and distillation. Sloping newly exposed soil surfaces so water drains to a spot where it can be pumped or channeled to a place it can be disposed of would be but one example of a provision to drain rainwater. Others are diverters, gutters, plastic sheeting, or tarp systems designed to channel rainwater away from the salt biomass composite during construction of the dry tomb structure. Different types of diverters or gutters will be used throughout construction and can be made from earthen structures, plastics, tarps, or sandbags.

In a preferred embodiment a high-capacity adsorbent is used during construction to prevent rainwater or dew from soaking into the salt biomass composite being filled. The high-capacity adsorbent is used to form a temporary barrier or as part of a temporary barrier that mitigates the effects of rain or dew. In the most preferred embodiment the high-capacity sorbent is regenerable. The sorbent can be spread onto the exposed surface of the biomass and mechanically gathered up before more biomass or biomass salt composite is added. Alternatively, it can be placed in water permeable bags such as burlap bags, placed over the biomass to prevent water intrusion, and taken up before more biomass or biomass salt composite is added. Alternatively, it can be composited with a geotextile which is placed over the exposed surface of the biomass and taken up before more biomass or biomass salt composite is added. In another embodiment it is placed in regions where tarps, or temporary geomembranes, or other covering materials adjoin to prevent water intrusion through gaps, overlaps or seams. In this embodiment it can be placed either above or below gaps, overlaps, or seams in tarps, temporary geomembranes, or other covering materials. In all instances the high-capacity adsorbent blocks flow of liquid water through gaps, overlaps or seams into the biomass salt composite being filled. From economic considerations in all cases it is preferred to use a regenerable high-capacity adsorbent that can be reused during construction. To reuse the high-capacity adsorbent it is regenerated thermally, by exposure to dry air, or by outdoor exposure to wind and solar radiation. High-capacity regenerable adsorbents for this application should have a working capacity of at least 0.5 grams of water per gram of dry sorbent, preferably the working capacity is at least 2 grams of water per gram of dry sorbent and even more preferably the working capacity is at least 5 grams of water per gram of dry sorbent. Examples of regenerable high-capacity adsorbents are superabsorbent polymers that can adsorb an amount of water that is about 50 to 400 times their dry weight when exposed to fresh water. In salty water they absorb somewhat less. An example of a superabsorbent polymer is Na polyacrylate. Other examples are cross-linked polyacrylates and polyacrylamides; cellulose- or starch-acrylonitrile graft copolymers; and cross-linked maleic anhydride copolymers.

To construct the biolandfill, the surface of the land is excavated and graded. Construction of protective layers for the bottom seal is then begun on what will become the bottom of the dry tomb structure. Once protective layers are in place construction of the bottom seal is begun with the instillation of at least one water transport barrier. Additional water transport barriers may be installed at this point along with any protective and spacer structures that become part of the bottom seal. This step to make a bottom seal structure may also involve the optional instillation of a protective barrier between the ground and outermost water transport barrier or between the biomass and innermost water transport barrier. Following this step biomass and salt or a salt biomass composite can be added into the biolandfill. It is envisioned that biomass would be stored at or near the biolandfill site. Ideally storage would be in a relatively dry condition such as under a tarp or in a warehouse or shed and if needed it would be dried and possibly chopped before adding it into the biolandfill being constructed. The way in which it is added depends significantly on how the biomass has been compressed as well as how the salt biomass composite is formed. It can be physically stacked in the biolandfill if it is compacted with equipment that chops, dries, and produces composite salt biomass briquettes (potentially plastic wrapping or bagging them), or pure biomass briquettes with a separate salt addition (with potential plastic wrapping or bagging). Similarly compressed dry salt biomass composite bales or pure biomass bales with a separate salt addition can be physically stacked within the biolandfill. In addition, these bales can be plastic wrapped. When compressed biomass with a separate salt addition or compressed salt biomass composites are stacked as briquettes or bales, earthworks may in some instances be constructed to hold them in place, providing an anchoring point for a temporary tarp system, or providing drainage for rainwater, or providing the base for a temporary canopy structure used to protect areas being filled from rain. Potentially these earthworks could occupy 25% of the volume of the finished dry tomb structure and would build up as the height of the stacked salt biomass composite increases. One form of earthwork would be a dike structure or earthen causeways forming channels into which the compressed salt biomass composite is stacked. In addition, these earthworks could be used to compartmentalize regions of the biolandfill with sealed plastic sheeting that acts as a secondary water transport barrier. It should be noted if secondary water transport barriers are installed then any plastic wrapping or bagging of compressed biomass or a compressed salt biomass composite would provide a tertiary water transport barrier. If there is no compartmentalization with plastic sheeting then plastic wrapping or bagging of compressed biomass or a compressed salt biomass composite would be providing a secondary water transport barrier.

For mechanical compaction, biomass is dumped as a layer in a portion of the biolandfill and mechanical compaction equipment is run over it in multiple passes to densify it. Salt can be homogeneously mixed with the biomass or added heterogeneously (for example in a thin layer). In some instances, the biomass will have been chopped before it is dumped. Construction with this type of compaction can be done with or without earthworks. To keep salt biomass composites dry, temporary tarp systems and/or canopies can be constructed. In addition, plastic sheeting can be installed to seal off areas that are fully compressed. Such sealed plastic sheeting compartmentalizes the biolandfill and provides a secondary water transport barrier. In all events the biolandfill is gradually built up from the base and as it rises the desired piping structure can be built or installed later for example by drilling. As it rises above the earth's surface to its filled height, the top seal is completed. This involves instillation of at least one water transport barrier and any spacer structures, or additional water transport barriers, or additional layers used to protect the top seal. Soil is used to cover completed water transport barriers as they are constructed, or after the dry tomb structure has been finished. Piping rising above the completed biolandfill surface is completed with instillation of valving and provision to connect to analytical instrumentation and to flow purge gas.

The following examples illustrate aspects of the invention:

Example 1

Figure 4:
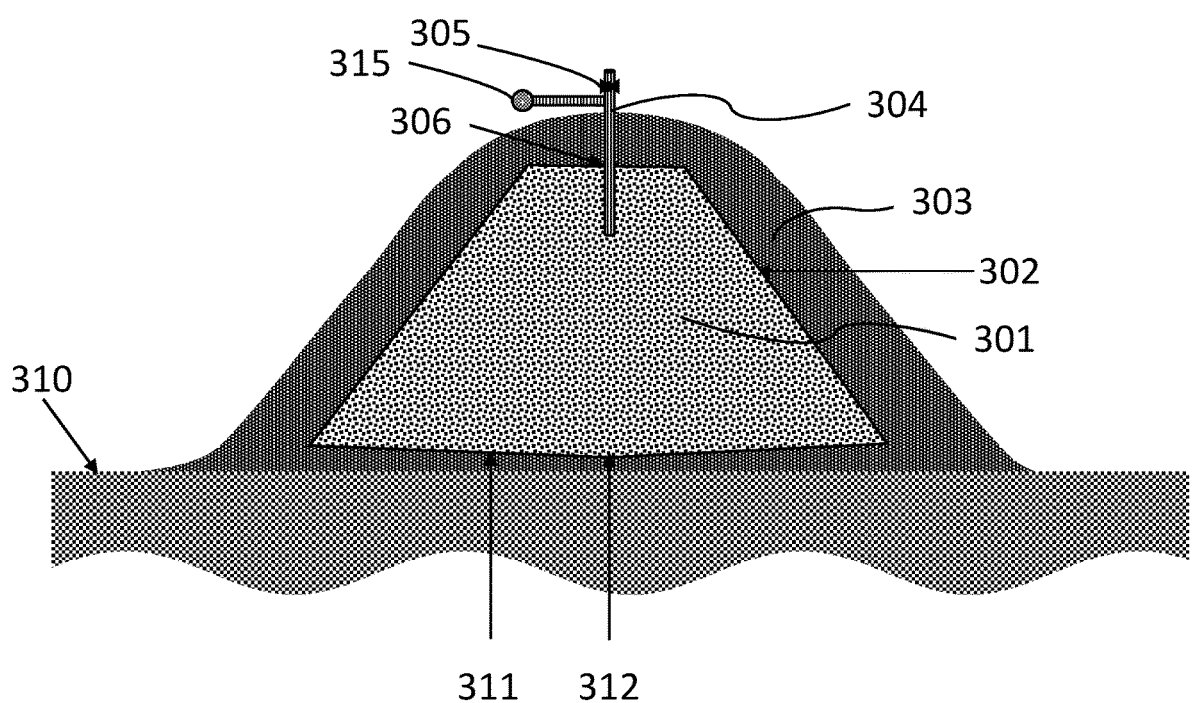
FIG. 4 shows elements of a verifiable dry tomb biolandfill constructed at the earth's surface containing a dry tomb structure formed by top and bottom seals containing a single water transport barrier enclosing a salt biomass composite with a single sealable pipe connecting the dry tomb to the surface of the biolandfill.

This embodiment illustrates a form of a Verifiable and Mitigatable Preserved Biolandfill for Biological Carbon Sequestration and is illustrated in FIG. 4. It is comprised of a dry tomb structure containing a compressed dry salt biomass composite [301] enclosed by one barrier to water transport [302]. In addition, there is a solid wall sealable pipe (or conduit) [304] connecting the surface of the biolandfill to the interior of the dry tomb along with an atmospheric isolation valve that can be opened when sampling gas composition. Although the base of the dry tomb structure [311,312] is slightly above the surface of the earth [310], it is subterranean because it is covered with a layer of soil that protects it from environmental disturbance. The sealable solid wall pipe or conduit [304] connecting the interior of the dry tomb to the exterior surface of the biolandfill is hermetically sealed to the water transport barrier [302] preventing ingress of ground water that might percolate through the soil cover [303]. In this example the water transport barrier forms the top and bottom seals in the biolandfill. These features [301, 302, 303, 304, 305, and 306] comprise the essential elements of verifiable dry tomb biolandfills capable of sequestering salt biomass composites. In addition, it is preferred that the base of the dry tomb structure be sloped [311] to drain water to a spot where it can be collected. As shown the spot where water drains to [312] is near the lateral midpoint of the biolandfill. By changing the grading this spot [312] can be moved laterally anywhere across the base of the biolandfill. It is also possible to excavate a depression at this spot providing an option to accumulate a larger volume of water.

FIG. 4 is a schematic drawing and is not to scale. For the embodiment shown in FIG. 4 the lateral extent of the compressed salt biomass composite near the bottom of the landfill is in a range from 100 to 1,000 feet. The height of the region containing the compressed salt biomass composite (approximately from locations [312] to [306]) is between 30 and 400 feet. In this example the water transport barrier is made from thermally welded sheets of 80-160 mil thick polyethylene. Optionally to mechanically protect the water transport barrier [302] clay layers, geo-nets, geomembranes, geocomposites or combinations thereof can be located on one or both sides of the polyethylene sheet. For this embodiment the pipe [304] has a diameter between 2 and 6 inches and is made from PVC plastic. Thickness of the soil layer [303] covering and protecting the upper surfaces of the dry tomb structure is in a range between 20 and 60 feet. The sequestration region of the dry tomb structure containing the compressed salt biomass composite [301] has a biomass volume fraction of at least 40%, more preferably this region has a biomass volume fraction greater than 60%, and most preferably this region has a biomass volume fraction greater than 80%. Many other materials can be included in this region including gas voids, soil, clay, and secondary or tertiary water transport barriers. In all instance the biomass is dried before placing it into the biolandfill.

The compressed salt biomass composite can be in the form of compressed bales or briquettes (bricks, sheets, pellets, or extrudates) placed into the biolandfill with or without the addition of salt, or a mixture (or jumble, or layers) of salt and biomass dumped into the biolandfill and compacted in place as well as mixtures of these different forms of salt biomass composites. When the salt biomass composite comprises bales or briquettes (bricks, sheets, pellets, or extrudates) they can be packaged in plastic (for example sealed plastic bags) or unpackaged. In all events the average salt content (salt weight counting solids and salt in brines) of the salt biomass composite [301] is at least 0.0001 wt. % of the dry weight of the biomass and less than 75 wt. % of the dry weight of the biomass. More preferably the average salt content (salt weight counting solids and salt in brines) of the salt biomass composite [301] is at least 0.5 wt. % of the dry weight of the biomass. In this example the salt can be $MgCl_2$, $CaCl_2$, or NaCl. In other potential embodiments the earth's surface [310] is excavated and the base of the dry tomb structure is located below the surface of the earth at depths similar to municipal landfills or mining operations.

The biolandfill described in this embodiment is verifiable, however it is not easily repairable. Verification can be done by installing a pressure gauge [315] on the sealable solid wall pipe [304] connecting the interior of the dry tomb to the atmosphere. Biomass decay will cause pressure in this sealable pipe to rise as long as valve [305] remains closed. By monitoring the pressure gauge [315] one can assess biomass degradation. If pressure in the biolandfill builds up, biogas can be vented through the sealable solid wall pipe [304]. During any venting it is also possible to connect analytical instrumentation to determine gas composition. Venting offers some potential mitigation but does not restore sequestration conditions. Ideally greenhouse gasses vented are not directly released to the atmosphere but utilized in a combustion process and/or captured and sequestered. As such this biolandfill composition is verifiable and mitigatable, but not easily repairable.

Example 2

Figure 5:
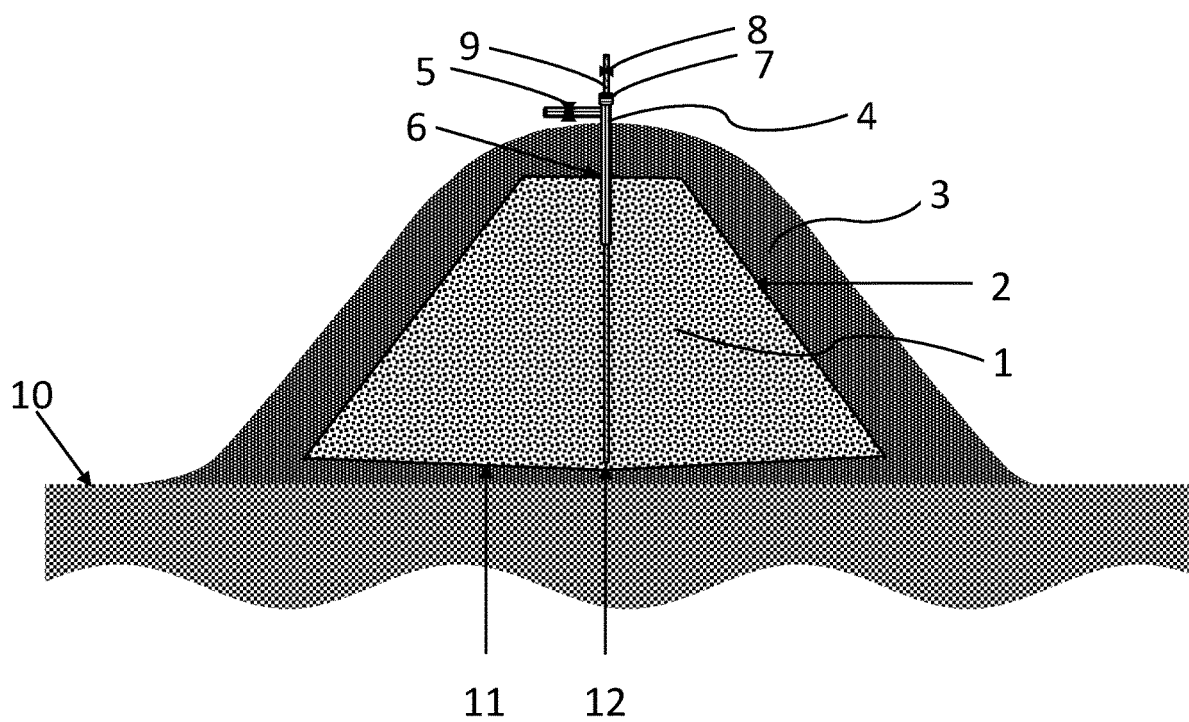
FIG. 5 shows elements of a verifiable and repairable dry tomb biolandfill containing a dry tomb structure formed by top and bottom seals containing a single water transport barrier enclosing a salt biomass composite that is constructed at the earth's surface with a sealable coaxial piping structure.

This embodiment illustrates a simple form of a Verifiable and Repairable Preserved Biolandfill for Biological Carbon Sequestration and is illustrated in FIG. 5. Shown is a dry tomb structure formed by a single barrier to water transport [2] surrounding a region containing a compressed salt biomass composite [1] along with two sealable solid wall pipes (or conduits) [4,9] connecting the surface of the biolandfill to the interior of the dry tomb along with atmospheric isolation valves [5,8] that can be opened when sampling gas composition or purging with gas. The dry tomb structure [2] containing a compressed salt biomass composite [1] is constructed at the earth's surface [10] but is subterranean because it is covered with a thick layer of soil [3] that protects it from environmental disturbance. In other potential embodiments the earth's surface [10] is excavated and the base of the dry tomb structure is located below the surface of the earth at depths similar to municipal landfills or mining operations. In this example the water transport barrier forms the top and bottom seals of the dry tomb structure. Features [1,2,3,4, 5, 8, and 9] comprise essential elements of verifiable and repairable dry tomb biolandfills capable of sequestering biomass. In addition, there must be a hermetic seal that prevents water leaking through the connection of water transport barriers to the piping structure. In this embodiment there is only one hermetic seal [6] because one of the sealable pipes (or conduits) [9] runs coaxially inside of the other [4]. Examples 4 and 7 will discuss non-coaxial piping arrangements that provide the essential elements of verifiable and repairable dry tomb biolandfills capable of sequestering salt biomass composites. In this embodiment the smaller diameter sealable solid wall pipe [9] is coaxially sealed [7] to the larger diameter sealable solid wall pipe [4] mechanically supporting the coaxial piping and preventing ingress of atmospheric water into the coaxial piping structure. As shown the second smaller diameter sealable solid wall pipe [9] comes almost to the base [12] of the dry tomb structure. This smaller diameter sealable solid wall pipe [9] also has a valve [8] that seals the pipe from the atmosphere. When opened this valve [8] can be used in combination with the valve [5] on the larger diameter sealable solid wall pipe [4] to flow a purge and sample gas from the biolandfill, or simply purge water and moisture from the biolandfill, or to handle unanticipated amounts of biogas generation. Depending on preference the purge can be flowed from top to bottom of the dry tomb or bottom to top of the dry tomb. It should be noted that purges such as this are not a feature of municipal landfills. In addition, it is preferred that the base of the dry tomb structure [11] be sloped to drain water to a spot where it can be collected. As shown the spot where water drains to [12] is near the lateral midpoint of the biolandfill. By changing the grading this spot [12] can be moved laterally anywhere across the base of the biolandfill. It is also possible to excavate a depression at this spot providing an option to accumulate a larger volume of water. It should also be noted that FIG. 5 is a schematic drawing and is not to scale. For the embodiment shown in FIG. 5 the lateral extent of the salt biomass composite near the bottom of the landfill is in a range from 100 to 1,000 feet. Height of the region containing the salt biomass composite (approximately from locations [12] to [6]) is between 30 and 400 feet. In this example the water transport barrier [2] is made from thermally welded sheets of 80 to 160 mil thick polyethylene. Optionally to mechanically protect the water transport barrier [2] clay layers, geonets, geomembranes, geotextiles, geocomposites or combinations thereof can be located on one or both sides of the polyethylene sheets forming structured top and bottom seals. For this embodiment the larger sealable solid wall pipe [4] has a diameter between 4 and 8 inches and the inner sealable solid wall pipe [9] has a diameter between 1 and 3 inches. Both sealable solid wall pipes [4,9] are made from PVC plastic. Thickness of the soil layer [3] covering and protecting the upper surfaces of the dry tomb structure is in a range between 20 and 60 feet. The sequestration region of the dry tomb structure has a biomass volume fraction of at least 40% more preferably this region has a biomass volume fraction greater than 60% and most preferably this region has a biomass volume fraction greater than 80%. Many other materials can be included in this region including gas voids, soil, clay, and secondary or tertiary water transport barriers. In all events this region contains a compressed dried salt biomass composite [1] with an average salt content (salt weight counting solids and salt in brines) [1] of at least 0.0001 wt. % of the dry biomass weight and less than 75 wt. % of the dry weight of the biomass. More preferably the average salt content (salt weight counting solids and salt in brines) of the salt biomass composite [1] is at least 0.5 wt. % of the dry weight of the biomass. Possible forms for this salt biomass composite are taken to be the same as that in Example 1. The region containing the salt biomass composite [1] may also be compartmentalized with water transport barriers, soil structures, earthworks, or clay structures.

The biolandfill described in this embodiment is verifiable and repairable. Verification can be done by installing a pressure gauge on one of the sealable solid wall pipes [4 or 9] that connects the interior of the dry tomb to the atmosphere. Biomass decay will cause pressure in this pipe [4 or 9] to rise as long as the valves [5,8] remain closed. By monitoring the pressure gauge one can assess biomass degradation. More preferably verification is done using analytic instrumentation connected to one of the sealable solid wall pipes [4 or 9] to measure composition of gas displaced out of the biolandfill from a purge flowed into the opposite pipe [9 or 4] with valves [5 and 8] opened. If significant biomass degradation is detected, the biolandfill can be purged with dry gas to remove water. This type of dry purge provides a means of repairing the sequestration conditions in the biolandfill. An alternative repair would be to use the sealable solid wall pipes [4,9] to flow a highly concentrated brine into the dry tomb structure.

When the biolandfill described in this example is constructed a means to introduce (i.e. flow) purge gas into the biolandfill may not necessarily be in place. In this case the biolandfill would still be verifiable because biomass degradation can be measured by monitoring any buildup of pressure from biogas generation. Without means to introduce purge gas, effects of biogas generation in the landfill could also be somewhat mitigated. As in Example 1, biomass degradation could be mitigated by opening one of the valves [5 and 8], relieving pressure and letting biogas flow out of the landfill. If this mitigation procedure is used, gas composition can be measured by letting sufficient gas flow out from the dry tomb to obtain a representative gas sample. If larger quantities of biogas flow out of the landfill, it is preferred not to release greenhouse gasses to the atmosphere but to utilize them in a combustion process and/or capture and sequester them. As such, at the time of construction a biolandfill described in this example without facilities to flow purge gas would be an example of a "Verifiable and Mitigatable Preserved Dry Tomb Biolandfill for Biological Carbon Sequestration". Once equipment to flow purge gas is added the biolandfill would become a "Verifiable and Repairable Preserved Dry Tomb Biolandfill for Biological Carbon Sequestration".

Example 3

Figure 6:
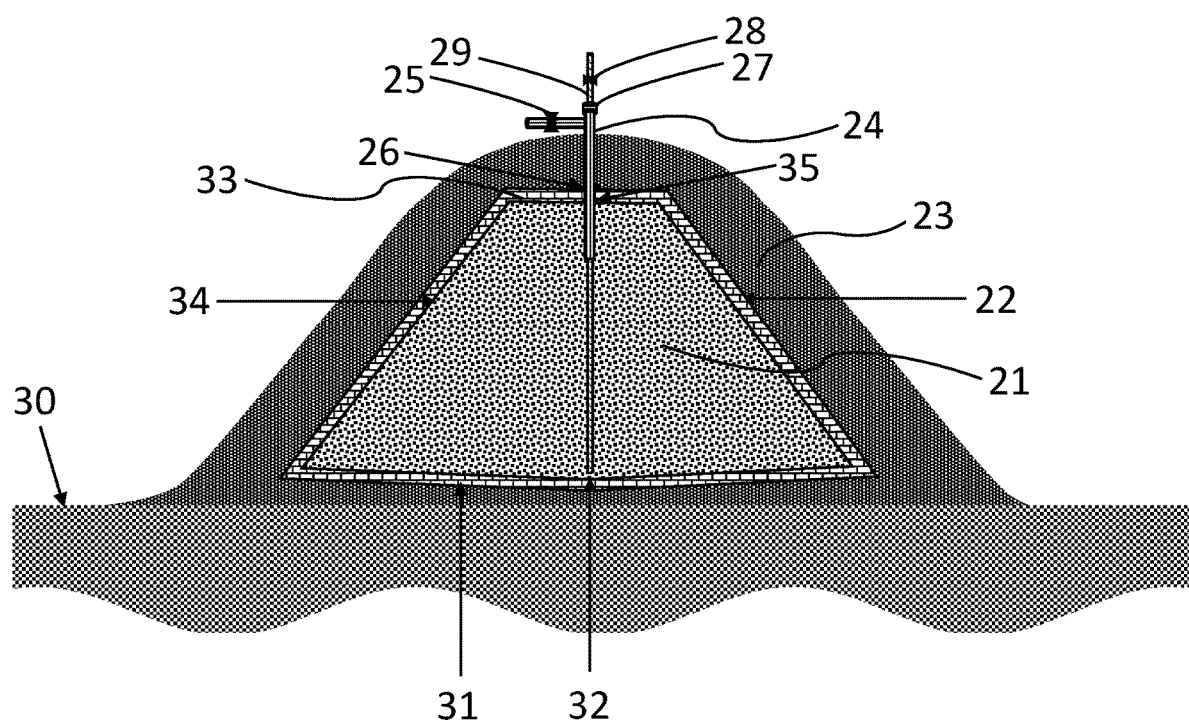
FIG. 6 shows elements of a verifiable and repairable dry tomb biolandfill constructed at the earth's surface containing a sealable coaxial piping structure and a dry tomb structure formed by top and bottom seals containing two nested water transport barriers separated by a spacer structure that encloses a salt biomass composite.

Example 3 illustrates an alternate water barrier from that utilized in Example 2 and a cross-section of the improved biolandfill is illustrated in FIG. 6. This example has a top and bottom seal structure containing two water transport barriers [22,34] while Example 2 had only one water transport barrier [2]. FIG. 6 shows a cross-sectional view of a dry tomb structure containing a compressed salt biomass composite [21] with two barriers to water transport [22,34] that are part of the top and bottom seal structure. The seal structures surround a region containing the compressed salt biomass composite [21] along with two sealable solid wall pipes (or conduits) [24,29] connecting the surface of the biolandfill to the interior of the dry tomb with atmospheric isolation valves [25,28] that can be opened when sampling gas composition or purging with gas. The water transport barriers [22,34] are nested with a layer (or spacer structure) [33] separating them that can contain soil, compacted soil, clay, geosynthetic clay, a geotextile, a geonet, a geosynthetic fabric, and combinations thereof. This layer serves to mitigate defects in the outer water transport barrier [22]. Thickness of this separating layer (or spacer structure) [33] is in a range from 0.05 to 1 meter. In some additional embodiments the composition of the separating layer (or spacer structure) can be different in the top seal and bottom seal structures. In some additional embodiments there is another layer on the outside of the outer transport barrier [22] that mechanically protects it from ground disturbance or provides extra protection to the ingress of water (such as a clay layer or a geonet draining water away from the biolandfill). In some embodiments there is another layer on the inside of the inner transport barrier [34] that mechanically protects it from mechanical disturbance from machinery used to place the salt biomass composite into the dry tomb or to provide extra protection to the ingress of water (such as a clay layer). The top and bottom seal structures contain the nested water transport barriers [22,34], the spacer structure [33], and any mechanical protection layers that are adjacent to the inner and outer water transport barriers. These seals delineate the boundary of the dry tomb structure. The dual water transport barrier structure [22,33,34] in the top and bottom seals necessitates two hydraulic seals [26, 35] between the sealable solid wall pipe [24] running to the surface from the interior of the dry tomb structure and the water transport barriers [22,34]. In a different embodiment the sealable solid wall pipe [24] is sealed to just one of the water transport barriers. Other aspects of this embodiment are similar to the embodiment shown in FIG. 5. Base of the dry tomb structure [31] is sloped to drain water to a spot where it collects [32].

There is a smaller diameter second sealable solid wall pipe [29] running coaxially inside of the sealable solid wall pipe that connects the interior of the dry tomb through the water transport barriers to the surface of the biolandfill. This smaller diameter sealable solid wall pipe [29] is coaxially sealed [27] to the larger diameter sealable solid wall pipe [24] mechanically supporting the coaxial piping and preventing ingress of atmospheric water into the coaxial piping structure. The second smaller diameter sealable solid wall pipe [29] comes almost to the base [32] of the dry tomb structure. This smaller diameter sealable solid wall pipe [29] also has a valve that seals the pipe from the atmosphere. When opened this valve [28] can be used in combination with the valve [25] on the larger diameter sealable solid wall pipe to flow a purge and sample gas from the biolandfill, or simply purge water and moisture from the biolandfill, or to handle unanticipated amounts of biogas generation. Depending on preference the purge can be flowed from top to bottom of the dry tomb or bottom to top of the dry tomb. The base of the biolandfill is slightly above the surface of the earth [30] and protected from the earth's environment by a thick layer of soil [33].

It should also be noted that FIG. 6 is a schematic drawing and not to scale. Dimensions for the biolandfill shown are similar to those described in Example 2 (FIG. 5).

This embodiment provides another example of a verifiable and repairable preserved dry tomb biolandfill for biological carbon sequestration. When the biolandfill described in this example is constructed a means to introduce (i.e. flow) purge gas into the biolandfill may not necessarily be in place. In this case the biolandfill would still be verifiable because biomass degradation can be measured by monitoring any buildup of pressure from biogas generation. Alternatively, if pressure has built up, gas composition can be measured by letting sufficient gas flow out from the dry tomb to obtain a representative gas sample. Without facilities to flow purge gas, biogas generation could also be mitigated in the manner described in Examples 1 and 2. As such, at the time of construction the biolandfill without facilities to flow purge gas would be an example of a Verifiable and Mitigatable Preserved Dry Tomb Biolandfill for Biological Carbon Sequestration. Once equipment to flow purge gas is added the biolandfill would become a Verifiable and Repairable Preserved Dry Tomb Biolandfill for Biological Carbon Sequestration.

Example 4

Figure 7:
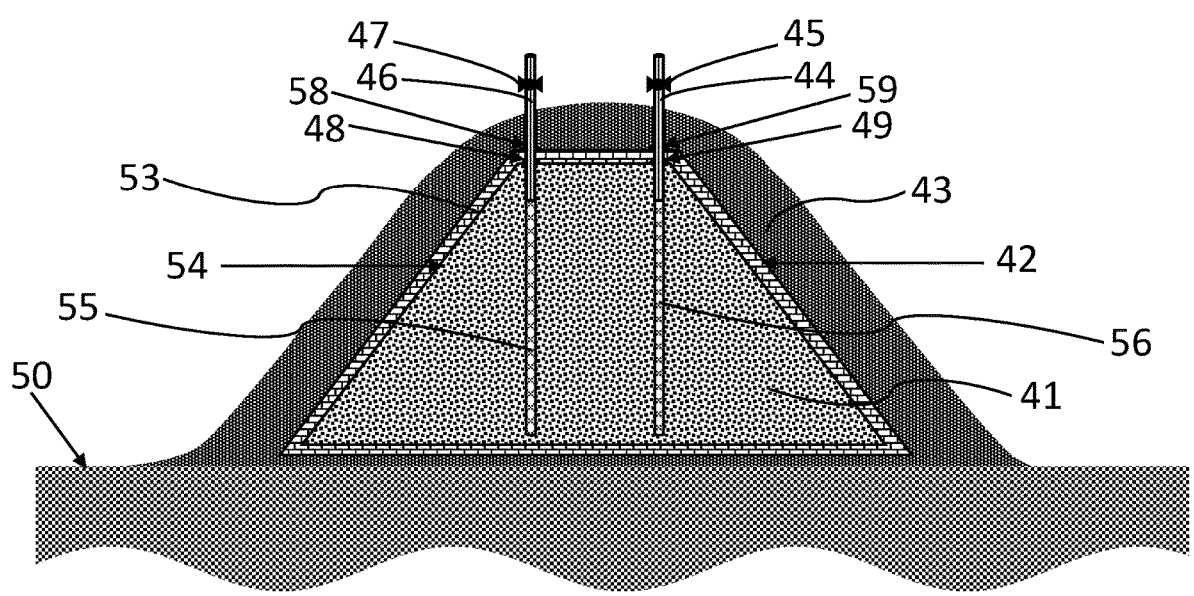
FIG. 7 shows elements of a verifiable and repairable dry tomb biolandfill constructed at the earth's surface containing two spatially separated sealable pipes and a dry tomb structure formed by top and bottom seals containing two nested water transport barriers separated by a spacer structure that encloses a salt biomass composite.

A cross-section of this embodiment is illustrated in FIG. 7 showing a different way of purging (flowing gas) through the biolandfill. In Example 3 (illustrated in FIG. 6), a purge gas would flow in a vertical direction (top to bottom or bottom to top) as opposed to this embodiment where the purge flows in a predominantly horizontal direction between two slotted (or porous pipes) [55,56]. These pipes are mechanically joined to two sealable solid wall pipes [44,46] which run from the interior of the dry tomb to the surface. Top and bottom seal structures in this example are similar to Example 2 and contain nested water transport barriers [42,54] and a spacer structure [53] with the boundaries of the dry tomb delineated by the top and bottom seals. The sealable solid wall pipes [44,46] are hermetically sealed [48,49,58,59] to both the inner [54] and outer [42] water transport barriers to prevent ingress of water into the dry tomb structure [42, 53,54] containing a salt biomass composite [41]. In another embodiment the sealable solid wall pipes are sealed to just one of the water transport barriers. To purge the biolandfill, relatively dry gas such as low humidity air is injected by opening valves [45,47] that seal the solid wall piping [44,46] and gas is injected into one of the sealable solid wall pipes and flows out the other. Within the dry tomb, slotted (or porous) piping [55,56] mechanically connected to the sealable solid wall pipes [44,46] injects and collects gas from the region containing the salt biomass composite [41]. Gas flowing in a predominantly horizontal direction can be used to sample gas composition from a significant portion of the dry tomb, or to purge excess water vapor, or to purge unwanted quantities of biogas, or to control the degree of anoxic and anaerobic conditions within the dry tomb. Studying the time dependence of the composition flowing out allows one to produce an approximate map of gas composition within the dry tomb. The base of the dry tomb structure is not sloped in the fashion shown in FIG. 6 however, it is possible to practice this embodiment with a sloped base. In most other respects the structure of the biolandfill is similar to that shown in FIG. 6 (Example 3). The dry tomb is constructed at the earth's surface [50] and covered with a layer of soil [43]. Top and bottom seals containing dual water transport barriers [42,54] with a spacer structure [53] separating them form the top and bottom seal structures which keep a low water activity in the biolandfill. FIG. 7 is a schematic drawing and is not to scale.

When the biolandfill described in this example is constructed facilities to introduce (i.e. flow) purge gas into the biolandfill may not necessarily be in place. In this case the biolandfill would still be verifiable because biomass degradation can be measured by monitoring any buildup of pressure from biogas generation. If pressure has built up, effects of biogas generation can be mitigated and/or gas composition can be measured by letting gas flow out from the dry tomb. As such without facilities to introduce purge gas, at the time of construction the biolandfill would be an example of a Verifiable and Mitigatable Preserved Dry Tomb Biolandfill for Biological Carbon Sequestration. Once equipment to flow purge gas is added the biolandfill would become a Verifiable and Repairable Preserved Dry Tomb Biolandfill for Biological Carbon Sequestration.

Example 5

Figure 8:
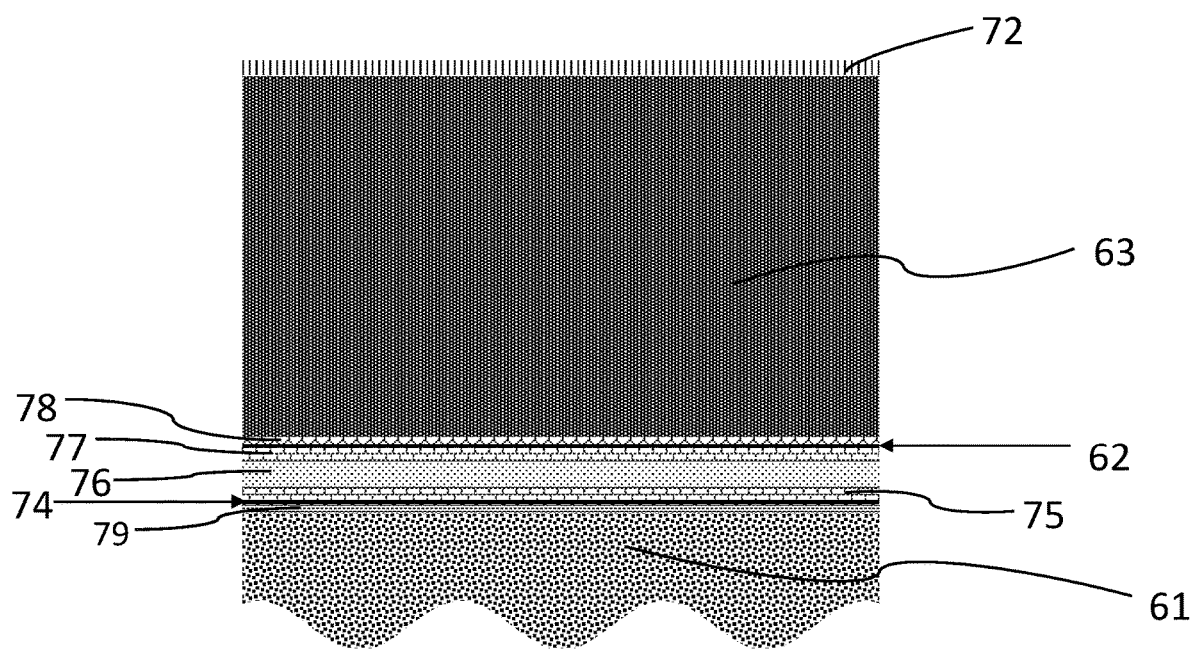
FIG. 8 shows a configuration for a top seal structure in a verifiable and repairable dry tomb biolandfill having two nested water transport barriers separated by a spacer structure.

This example is shown in FIG. 8 and illustrates an alternative embodiment of a configuration of the top seal structure [62, 74, 75, 76, 77, 78, 79] with dual water transport barriers [62, 74] separated by a spacer structure [75, 76, 77]. A protective layer of thick soil [63] with vegetation growing on its surface [72] covers the top seal structure [62, 74, 75, 76, 77, 78, 79]. The top seal structure contains a layer or layers [78] that cover and protects the outermost water transport barrier [62]. Thickness of the soil layer [63] is in a range from 10 to 100 feet and the first three feet (~1 meter) above the layer [63] that protects the outermost water transport barrier [62] is substantially boulder and rock free. In this embodiment the layer [78] that protects the outermost water transport barrier [62] is a geonet that drains water. In other embodiments the protective layer [78] could be a clay layer, a synthetic clay layer, a geocomposite, a geotextile, a geomembrane or other similar materials. Additionally, the protective layer [78] could be multiple layers containing a combination of such protective materials. The outermost water transport barrier [62] is made from sheets of 40 to 160 mil thick polyethylene that have been thermally joined with welded seams that prevent hydraulic flow of ground water. The outermost water transport barrier [62] is separated from the innermost water transport barrier [74] by a spacer structure composed of three layers [75, 76, 77]. The top and bottom layers in the spacer structure [77, 75] are composed of a 0.05 to 1 foot thick layer of geosynthetic clay and the middle layer in the spacer structure [76] is composed of a 0.1 to 2 feet thick layer of rock free compacted soil. This is the simplest composition for the middle layer in the spacer structure and there are a wide variety of other options including some that incorporate a high-capacity sorbent in this layer [76]. The spacer structure [75, 76, 77] mechanically protects the water transport barriers [62, 74] and also provides a mass transport resistance for the ingress of water. Additionally, water ingress into the geosynthetic clay layers [75, 77] will swell them helping to seal any defects in the water transport barriers [62, 74]. There are many other possible embodiments of spacer structures [75, 76, 77], with some having additional layers and others having fewer or different layers. In alternative embodiments layers 75 and 77 contain geocomposites, or geofabrics, or geosynthetics, or combinations of these with or without geosynthetic clay or clays. An additional protective layer [79] is located between the region containing the compressed entombed salt biomass composite [61] and the innermost water transport barrier [74]. When incorporated into a biolandfill, design of this layer can provide additional mechanical protection for the water transport barriers [62, 74] or additional mass transfer resistance to water ingress. In this embodiment it is a 0.2 to 1 foot thick layer of bentonite clay. It should be noted that FIG. 8 only shows the uppermost layers in the biolandfill, layers in the top seal and the uppermost portion of the region containing the salt biomass composite [61]. In this embodiment the top seal structure [62, 74, 75, 76, 77, 78, 79] is composed of the water transport barriers, the spacer structure and all mechanical protection layers.

Example 6

Figure 9:
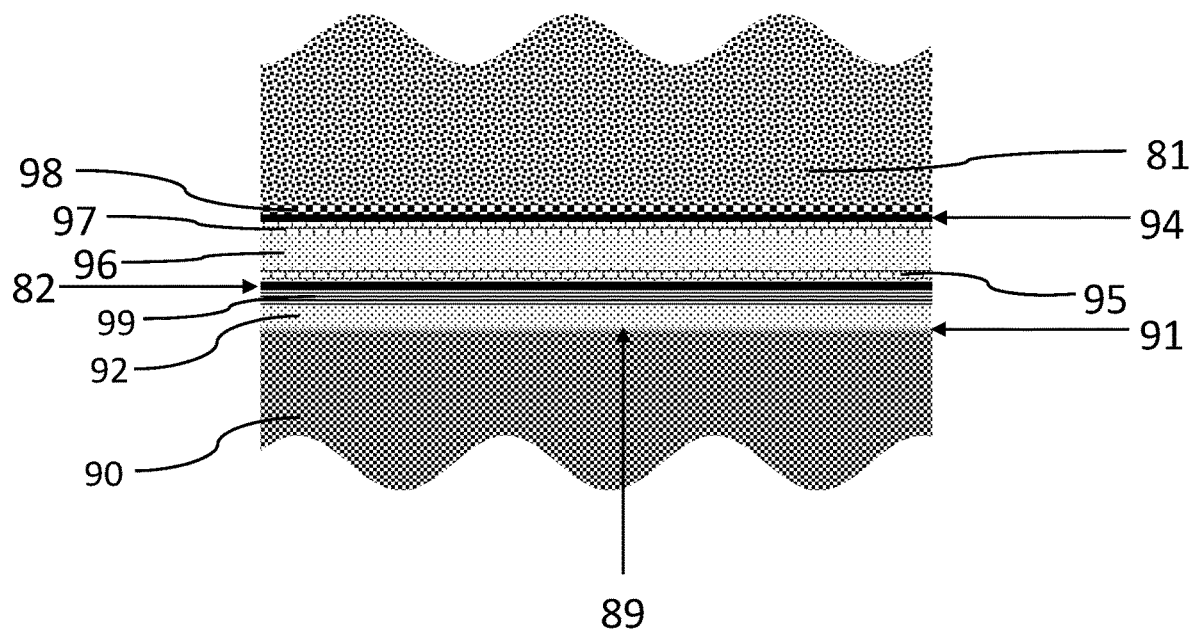
FIG. 9 shows a configuration for a bottom seal structure in a verifiable and repairable dry tomb biolandfill having two nested water transport barriers separated by a spacer structure.

This example is shown in FIG. 9 and illustrates an alternative embodiment of a configuration of the bottom seal structure [82, 94, 95, 96, 97, 98, 99] with dual water transport barriers [82, 94] separated by a spacer structure [95, 96, 97]. The biolandfill is constructed using a surface [91] that has been graded or excavated from the earth [90]. Above the base [89] of the biolandfill a layer [92] of rock free compacted soil is installed on the graded or excavated surface [91]. This provides a degree of protection for the bottom seal structure [82, 94, 95, 96, 97, 98, 99]. The lower extremity of the bottom seal structure has a protective layer [99] which in this embodiment is a 1 to 4 mm thick geotextile. A wide variety of other protective layers could be used including a layer of bentonite clay, or a geocomposite, or a geotextile, or a geonet. Alternative embodiments dispense with these protective layers and others have additional protective layers. What will become the outermost water transport barrier [82] is installed on top of the protective layer [99]. This water transport barrier [82] along with an inner water transport barrier [94] is made from sheets of 40 to 160 mil thick polyethylene that have been thermally joined with welded seams that prevent hydraulic flow of ground water. A spacer structure consisting of three layers [95, 96, 97] is installed on top of the outermost water transport barrier [82]. Top and bottom layers in the spacer structure [97, 95] are composed of a 0.05 to 1 foot thick layer of geosynthetic clay and the middle layer in the spacer structure [96] is composed of a 0.1 to 2 foot thick layer of compacted rock free soil. This is the simplest composition for the middle layer in the spacer structure and there are a wide variety of other options including some that incorporate a high-capacity sorbent in this layer [96]. Similarly, to Example 5, the spacer structure [95, 96, 97] mechanically protects the water transport barriers [82, 94] and also provides a mass transport resistance for the ingress of water. Clay layers [95, 97] repair defects transporting water by swelling to shut hydraulic flow off. Other possible embodiments of spacer structures [95, 96, 97], can have additional layers and others can have fewer or different layers. In alternative embodiments layers 95 and 97 contain geocomposites, or geofabrics, or geosynthetics, or combinations of these with or without geosynthetic clay or clays. On top of the spacer structure an inner water transport barrier [94] is installed and covered with a layer protecting [98] it from machinery used to form the region containing the compressed salt biomass composite [81]. In this embodiment the protecting layer [98] is a geotextile however a wide variety of other materials can be used. In this embodiment the bottom seal structure [82, 94, 95, 96, 97, 98, 99] is composed of the water transport barriers, the spacer structure, and all mechanical protection layers.

Example 7

Figure 10:
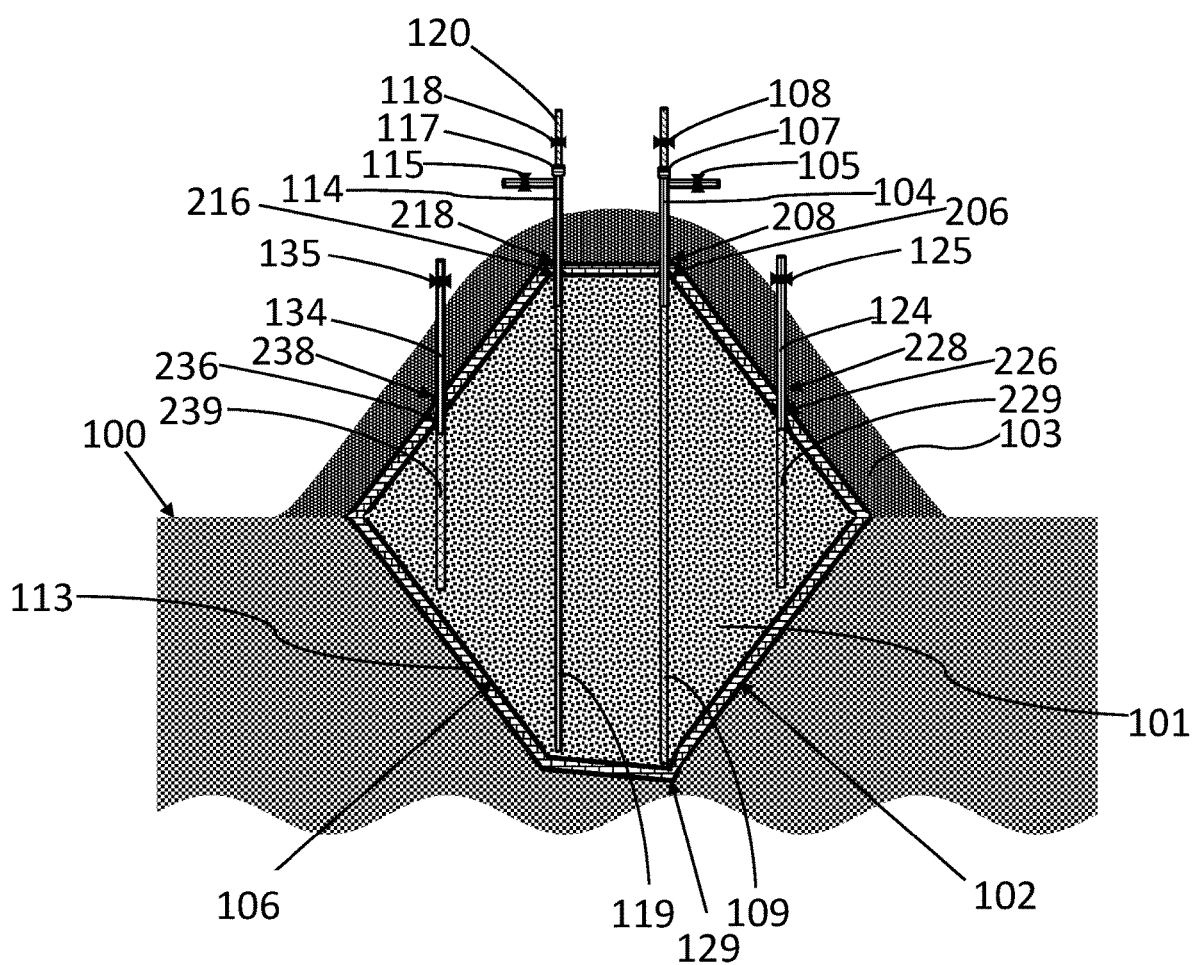
FIG. 10 shows a verifiable and repairable dry tomb biolandfill constructed with a base below the earth's surface containing a dry tomb structure formed by top and bottom seals containing two nested water transport barriers separated by a spacer structure that encloses a salt biomass composite with multiple sealable pipes that connect the dry tomb structure to the surface.

This example (shown in FIG. 10) illustrates a verifiable and repairable preserved dry tomb biolandfill containing a salt biomass composite [101] constructed with a base [129] well below the earth's surface [100]. The cross-sectional view in FIG. 10 shows a schematic drawing (not to scale) of two water transport barriers [102, 106] separated by a spacer structure [113] forming the top and bottom seals [102, 106, 113]. These seals [102, 106, 113] are the boundaries of a dry tomb structure containing a region with a dry salt biomass composite [101] that extends from well below to well above the earth's surface. Base of the dry tomb structure can be in a range from 20 to 80 feet below the earth's surface and the top of the dry tomb structure can be in a range from 30 to 300 feet above the earth's surface. Lateral extent of the dry tomb structure is in a range from 100 to 1000 feet. Top of the biolandfill extends in a range from 20 to 100 feet above the dry tomb structure because a thick layer soil [103] is installed to protect the dry tomb structure. Six sealable solid wall pipes [124, 104, 109, 114, 120, 134] extend from the surface into the dry tomb structure. All have valves [125, 105, 108, 115, 118, 135] that permit flowing a purge gas and/or gas sampling. To prevent ground water invasion pipes [124, 104, 114, and 134] are hermetically sealed [228, 208, 218, 238] to the outer water transport barrier [102]. In addition, these solid wall pipes [124, 104, 114, and 134] are hermetically sealed [226, 206, 216, 236] to the inner water transport barrier [106]. In an alternative embodiment these solid wall pipes [124, 104, 114, and 134] are hermetically sealed to just one of the water transport barriers. One of the sealable solid wall pipes [109] is coaxially located inside of another sealable solid wall pipe [104] and runs almost to the base [129] of the dry tomb structure which is sloped to collect any unexpected (unwanted) liquid water or brine draining to the base. It is supported and sealed to solid wall pipe [104] by flange [107]. Inner diameter of the sealable solid wall pipe [109] running almost to the base [129] of the dry tomb structure is in a range from 2 to 8 inches so that if needed, a pump can be inserted downhole to bring to the surface any unexpected (unwanted) water or brine that might accumulate. The valve [108] installed on this sealable solid wall pipe [109] is either removable or when opened has a clearance to allow a pump to be inserted downhole. There is a wide variety of downhole pumps available, and many have been used in oil and gas wells. In addition, these coaxially running pipes [109, 104] can be used to flow gas through a portion of the dry tomb structure in a predominantly vertical direction. Shown in FIG. 6 is another coaxial piping arrangement [120, 114]. A flange [117] seals the inner solid wall pipe [120] to the outer solid wall pipe [114] and helps support the inner solid wall pipe as well as a porous pipe [119] that the inner solid wall pipe joins to inside the dry tomb structure. This porous pipe [119] can be used to distribute purge gas throughout most of the height of the dry tomb structure. Towards the outer periphery of the landfill there are two additional sealable solid wall pipes [124, 134] coming to the surface. Both of these sealable solid wall pipes [124, 134] are joined to slotted pipes [229, 239] within the dry tomb structure. These slotted pipes can be used to distribute purge gas from near the periphery of the dry tomb structure. Used in combination the sealable solid wall piping [124, 104, 109, 114, 120, 134] at the surface can be used to purge and sample gas from most of the volume of the dry tomb structure.

The biolandfill containing a salt biomass composite described in this embodiment is verifiable and repairable. If significant biomass degradation is detected, there are multiple ways of purging the dry tomb structure with dry gas to remove water. This type of dry purge provides a means of repairing the sequestration conditions in the biolandfill. An alternative repair would be to use the piping to flow a highly concentrated brine into the dry tomb structure.

The biolandfill described in this example is preserved by the salt added to form a composite with the biomass. If significant biomass degradation is detected, there are multiple ways of purging the dry tomb structure with dry gas to remove water and/or pumping liquid water out of the dry tomb. These types of water vapor and liquid water removal provide a means of repairing the sequestration conditions in the biolandfill. When the biolandfill described in this example is constructed a means to introduce (i.e. flow) purge gas into the biolandfill may not necessarily be in place. In this case the biolandfill would still be verifiable and mitigatable because biomass degradation can be measured by monitoring pressure and buildup of pressure from biogas generation can be alleviated by venting. In a preferred embodiment vented biogas is used in a combustion process and/or greenhouse gasses are captured and sequestered. As such, at the time of construction the biolandfill without facilities to flow purge gas would be an example of a Verifiable and Mitigatable Preserved Dry Tomb Biolandfill for Biological Carbon Sequestration. Once equipment to flow purge gas is added the biolandfill would become a Verifiable and Repairable Preserved Dry Tomb Biolandfill for Biological Carbon Sequestration.

Example 8

Figure 2:
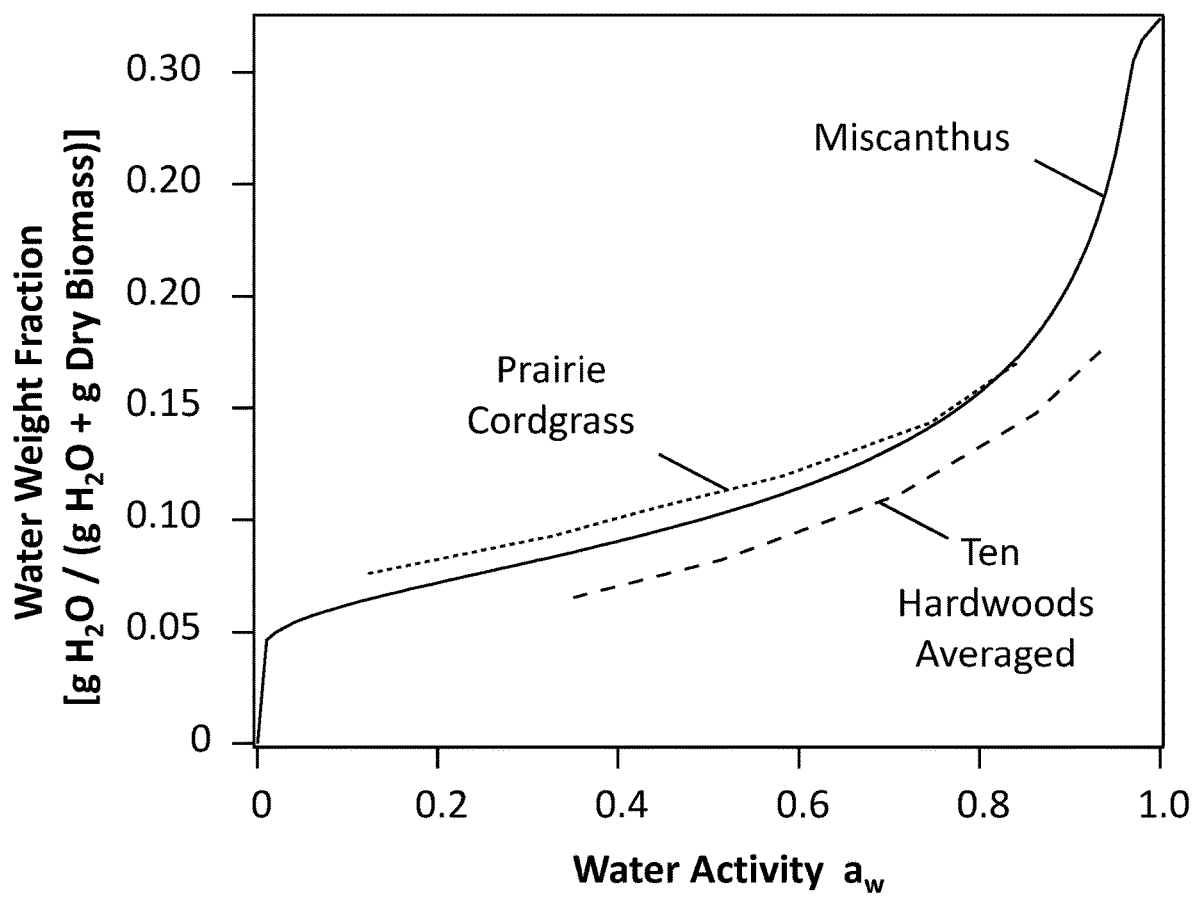
FIG. 2 shows water adsorption isotherms at 25 C for miscanthus, prairie cordgrass, and an average of ten hardwoods.
Figure 3:
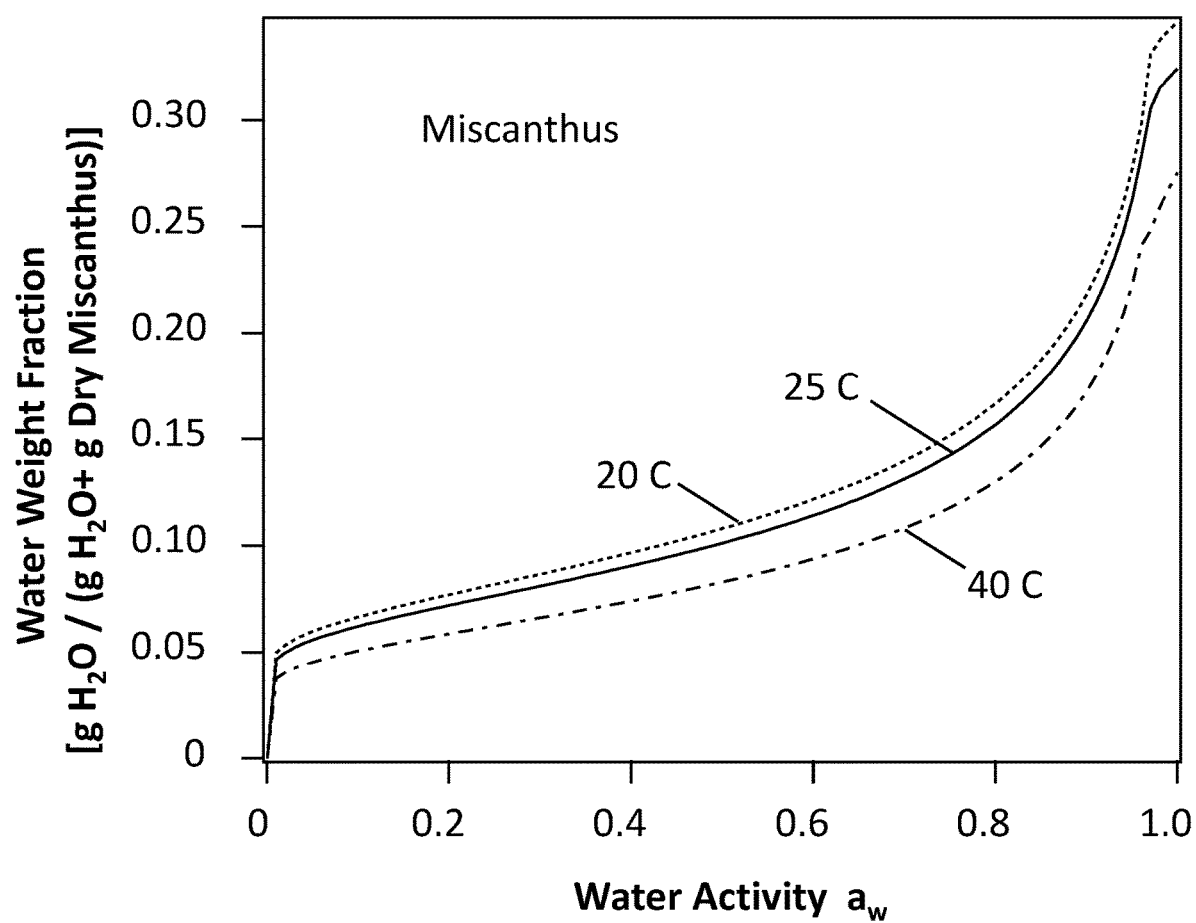
FIG. 3 shows water adsorption isotherms at 20 C, 25 C, and 40 C for miscanthus covering a range of water activity from 0 to approximately 1.0.
Figure 11:
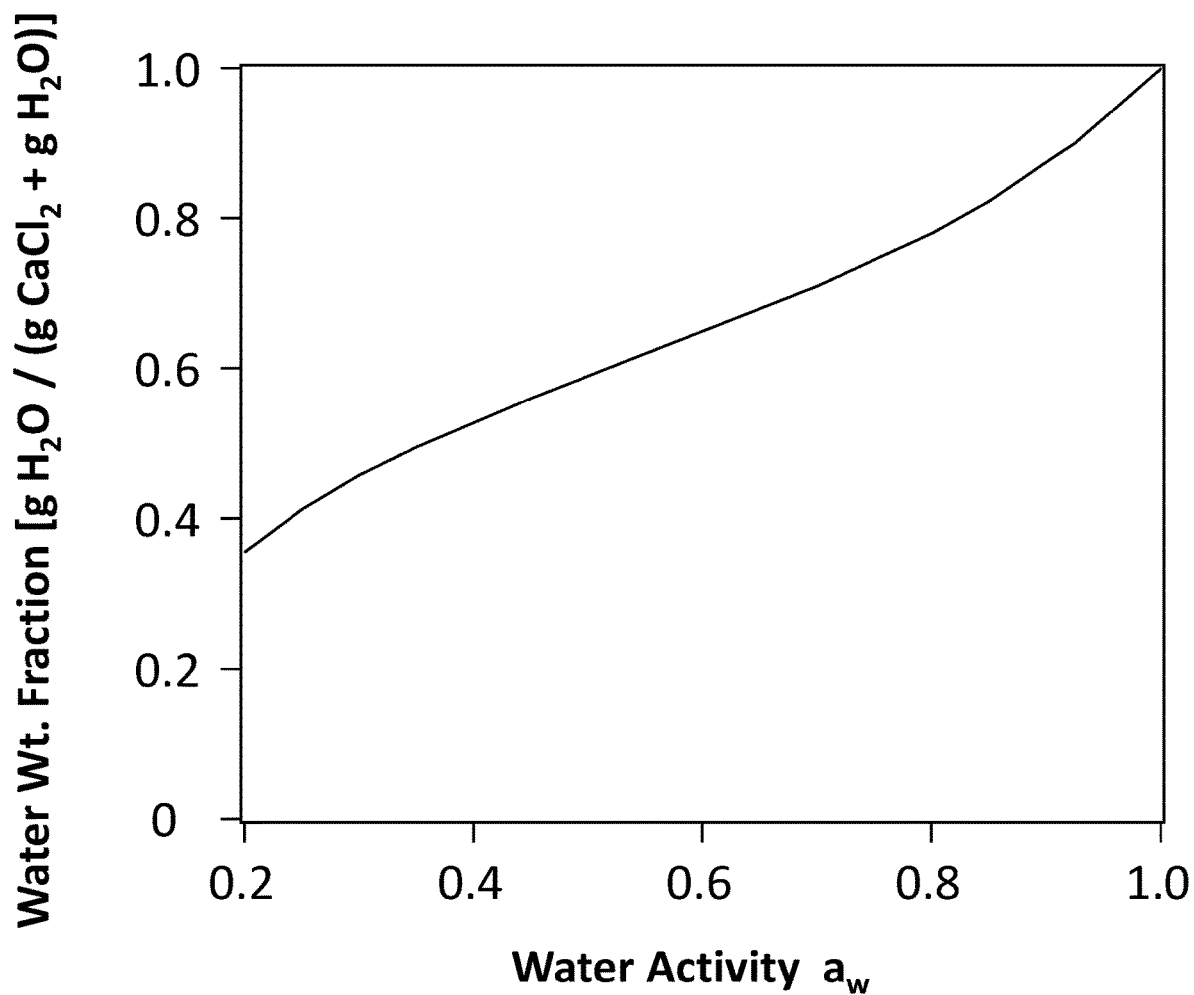
FIG. 11 shows water sorption isotherms at 25 C for $CaCl_2$ showing water uptake as water activity is increased from 0.2 to 1.0.
Figure 12:
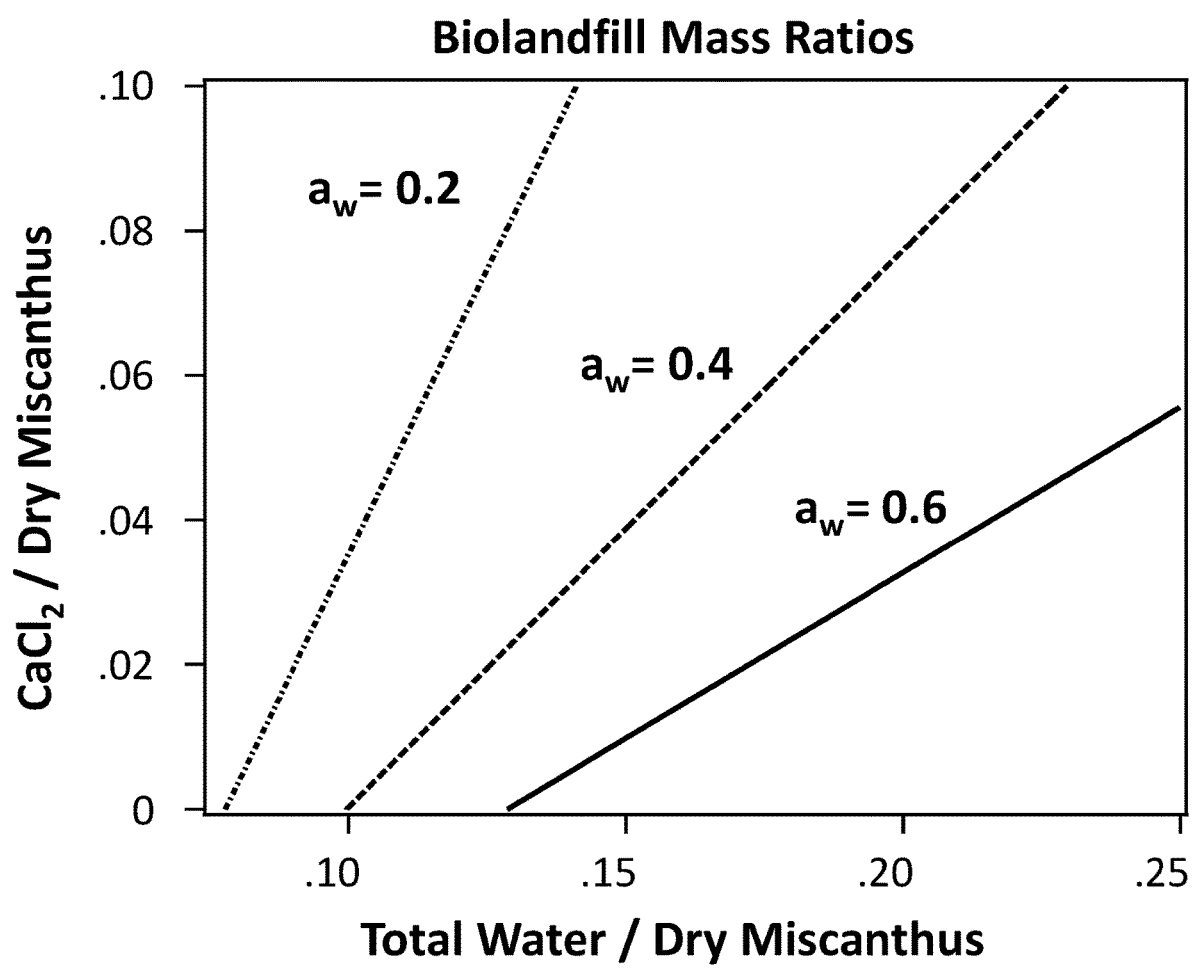
FIG. 12 shows mass ratio of $CaCl_2$) salt to dry miscanthus versus mass ratio of total water contained in the biolandfill to dry miscanthus. Lines show an amount of salt needed to lower water activity to 0.6, 0.4 or 0.2.

This example illustrates preferred compositions of $CaCl_2$ miscanthus composites for assured long term sequestration in a biolandfill. For assured long term storage the water activity should be less than 0.6. At this low water activity all microorganisms become dormant or die and as such biomass can be preserved indefinitely. The water adsorption branch isotherm for $CaCl_2$ shown in FIG. 11 is used to quantitatively determine the amount of salt needed for long term storage at 25 C. In combination with the miscanthus water adsorption isotherm (FIG. 2) one can calculate the mass ratios of {$CaCl_2$ salt/dry miscanthus} and {total water within the biolandfill/dry miscanthus} needed to obtain equilibrium water activities of 0.2, 0.4, and 0.6. Lines in FIG. 12 graphically show results from these calculations. Inspecting FIG. 12 it is seen that to obtain a water activity of 0.6 in a biolandfill which for every dry tonne of miscanthus has a total of 0.2 tonne of water requires about 0.033 tonne of $CaCl_2$ salt per tonne of dry miscanthus. This is an example of an extremely wet biolandfill since it is planned to dry the miscanthus to a water level below ~12 wt. % and to arrive at this high water level, 0.08 tonne of rainwater per tonne of dry miscanthus (~8 wt. %) would have had to have been incorporated into the biolandfill. For a dryer, biolandfill with a total of 0.15 tonne of water, would require 0.01 tonne of $CaCl_2$ salt per tonne of dry miscanthus, to achieve the same water activity of 0.6. This level of dryness can be achieved by protecting the biomass salt composite from rain during construction of the dry tomb structure. Protection can come from covering the exposed surface during rain storms with plastic sheets, or tarps, or canopies, or geotextiles, or geofabrics, or a soil covering. If soil is used as a protective layer it can be excavated after the rain storm. In some instances, the most recently added layer of salt biomass composite can be excavated and dried. In a preferred embodiment a regenerable high-capacity adsorbent is used during construction to prevent rainwater or dew from soaking into the salt biomass composite being filled. An example of a superabsorbent polymer is Na polyacrylate. Other examples are cross-linked polyacrylates and polyacrylamides; cellulose- or starch-acrylonitrile graft copolymers; and cross-linked maleic anhydride copolymers. If the ratio of total water to dry miscanthus is 0.1 salt is not needed to achieve a water activity of 0.6. In this case salt addition provides an insurance for dryness and salt levels as low at 0.0001 wt. % can be added to form the salt biomass composite.

In view of the many possible embodiments to which the principles of the disclosed invention may be applied, it should be recognized that the illustrative embodiments are only preferred examples of the invention and should not be taken as limiting the scope of the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

The invention claimed is:

1. A dry tomb biolandfill that preserves sequestered biomass comprising:
   a) A biomass salt composite with a water activity less than about 0.85 enveloped with top and bottom seal structures forming a dry tomb structure, said biomass salt composite having an average salt content of at least about 0.0001 wt. % of the dry weight of the biomass and less than about 75 wt. % of the dry weight of the biomass, and said top and bottom seal structures containing at least one water transport barrier.

2. The composition of claim 1 wherein the Water Vapor Transmission rate of the barriers to water transport within said top and bottom seal structures is in a range from 0.0 to 0.5 g/m$^2$/day when measured at 38° C. with a water activity in a range from 0.9 to 1.0 on one side and 0.05 or less on the opposite side of the barrier being tested.

3. The composition of claim 1 wherein said water activity is less than 0.85.

4. The composition of claim 1 wherein the salt comprises $CaCl_2$.

5. The composition of claim 1 wherein the salt comprises NaCl.

6. The composition of claim 1 wherein the biomass has been dried in a heated drying process so the water content of said biomass is in a range from 2 wt. % to 15 wt. %.

7. The composition of claim 1 wherein biomass in said salt biomass composite is compressed so that the average bulk density of the compressed biomass is greater than about 0.2 gram per cubic centimeter.

8. The composition of claim 1 wherein the biomass in the salt biomass composite that preserves sequestered biomass contains dried harvested biomass.

9. The composition of claim 1 wherein the biomass in the salt biomass composite that preserves sequestered biomass contains chemically altered biomass.

10. The composition of claim 1 wherein the salt biomass composite contains biomass enclosed in sealed plastic bags or sealed in plastic wrapping.

11. The composition of claim 1 wherein the top and bottom seal structures contain nested water transport barriers separated by a spacer structure.

12. The composition of claim 1 wherein there is at least one sealable solid wall pipe or conduit that connects the interior of the dry tomb structure to the earth's atmosphere making the preserved dry tomb biolandfill verifiable and mitigatable.

13. The composition of claim 12 wherein a readable analog or digital pressure gauge is installed in at least one of the sealable solid wall pipes or conduits.

14. The composition of claim 1 wherein there are at least two sealable solid wall pipes or conduits that connect the interior of the dry tomb structure to the earth's atmosphere, wherein said sealable solid wall pipes or conduits are permanently or temporarily connected to equipment that can flow a dry purge through said dry tomb structure making the preserved dry tomb biolandfill verifiable and repairable.

15. The composition of claim 14 wherein at least one gas analyzer is temporarily or permanently connected to at least one of the sealable solid wall pipes or conduits.

16. The composition of claim 14 wherein a portion of the verifiable and repairable dry tomb biolandfill cycles between aerobic, anoxic, and anaerobic conditions.

17. The composition of claim 14 wherein a downhole pump is installed to remove unwanted liquid water from the dry tomb structure.

* * * * *